US011449473B2

(12) United States Patent
Sasaki et al.

(10) Patent No.: US 11,449,473 B2
(45) Date of Patent: Sep. 20, 2022

(54) DISTRIBUTION HISTORY MANAGEMENT SYSTEM, DISTRIBUTION HISTORY MANAGEMENT DEVICE, METHOD, AND PROGRAM

(71) Applicant: NEC Corporation, Tokyo (JP)

(72) Inventors: Takayuki Sasaki, Tokyo (JP); Ryo Hamamoto, Tokyo (JP)

(73) Assignee: NEC CORPORATION, Tokyo (JP)

(*) Notice: Subject to any disclaimer, the term of this patent is extended or adjusted under 35 U.S.C. 154(b) by 395 days.

(21) Appl. No.: 16/614,630

(22) PCT Filed: May 26, 2017

(86) PCT No.: PCT/JP2017/019733
§ 371 (c)(1),
(2) Date: Nov. 18, 2019

(87) PCT Pub. No.: WO2018/216205
PCT Pub. Date: Nov. 29, 2018

(65) Prior Publication Data
US 2020/0151151 A1 May 14, 2020

(51) Int. Cl.
*G06F 16/18* (2019.01)
*G06F 16/182* (2019.01)
(Continued)

(52) U.S. Cl.
CPC ........ *G06F 16/1827* (2019.01); *G06F 21/604* (2013.01); *G06F 21/606* (2013.01); *G06F 21/6227* (2013.01)

(58) Field of Classification Search
CPC .......................... G06F 16/1827; G06F 21/604
See application file for complete search history.

(56) References Cited

U.S. PATENT DOCUMENTS

2005/0149741 A1* 7/2005 Humbel .............. B60R 25/1025
                                                      713/186
2011/0040688 A1* 2/2011 Ren ........................ G06Q 30/02
                                                      709/219
(Continued)

FOREIGN PATENT DOCUMENTS

JP       2002-342740 A    11/2002
JP       2004-287810 A    10/2004
(Continued)

OTHER PUBLICATIONS

Victor Costan et al., "Intel SGX Explained," Jan. 2016, pp. 1-118.
(Continued)

*Primary Examiner* — Eliyah S. Harper

(57) ABSTRACT

A data tracking unit 80 includes a distribution history storage unit 81 that stores a distribution history of data, a tracking tag adding unit 82 that adds a tracking tag used to identify tracking data, a first transmission unit 83 that transmits data to which the tracking tag is added to the component 90, and a distribution history registration unit 84 that registers a distribution history of the data to which the tracking tag is added, in the distribution history storage unit 81. The component 90 includes a second transmission unit 91 that transmits data to which the same tracking tag as a tracking tag added to the received data is added to another component 90 or the data tracking unit 80. The history registration unit 84 registers a result of tracking of data associated with the same tracking tag, as a distribution history of the data, in the distribution history storage unit 81.

10 Claims, 15 Drawing Sheets

(51) Int. Cl.
*G06F 21/60* (2013.01)
*G06F 21/62* (2013.01)

(56) References Cited

U.S. PATENT DOCUMENTS

| | | | | |
|---|---|---|---|---|
| 2013/0179942 | A1* | 7/2013 | Caplis | H04L 67/56 |
| | | | | 726/3 |
| 2015/0088982 | A1* | 3/2015 | Johnson | H04L 67/125 |
| | | | | 709/203 |
| 2015/0370839 | A1* | 12/2015 | Bareket | G06F 16/1827 |
| | | | | 707/741 |
| 2016/0092463 | A1* | 3/2016 | Vijayan | H04L 67/1097 |
| | | | | 707/626 |
| 2016/0112262 | A1* | 4/2016 | Johnson | G06F 9/4411 |
| | | | | 709/221 |
| 2017/0126715 | A1 | 5/2017 | Ikuse et al. | |
| 2017/0337287 | A1* | 11/2017 | Gill | G06F 16/27 |
| 2019/0057340 | A1* | 2/2019 | Wang | G06F 16/29 |

FOREIGN PATENT DOCUMENTS

| | | |
|---|---|---|
| JP | 2005-078506 A | 3/2005 |
| JP | 2011-197793 A | 10/2011 |
| JP | 2016-524844 A | 8/2016 |
| WO | 2016/002605 A1 | 1/2016 |

OTHER PUBLICATIONS

Intel Corporation, "Intel Software Guard Extensions," Reference No. 332680-002, Revision No. 1.1, Jun. 2015, pp. 1-238.
International Search Report of PCT/JP2017/019733 dated Aug. 29, 2017.

* cited by examiner

DISTRIBUTION HISTORY MANAGEMENT SYSTEM, DISTRIBUTION HISTORY MANAGEMENT DEVICE, METHOD, AND PROGRAM

CROSS REFERENCE TO RELATED APPLICATIONS

This application is a National Stage of International Application No. PCT/JP2017/019733 filed May 26, 2017.

TECHNICAL FIELD

The present invention relates to a distribution history management system, a distribution history management device, a distribution history management method, and a distribution history management program which manage a distribution history of data.

BACKGROUND ART

In a large number of systems connected through communication networks, various processes are performed by exchanging data. For example, in an urban system, such as a smart city, various processes are performed on various data generated by various things. Furthermore, in an internet of things (IoT) platform, various "things" are connected to the Internet, and various controls are performed by exchanging data.

In an environment where control processing or the like is performed by using various data, it is indispensable to manage data history. For example, PTL 1 describes that an IoT network comes to mainly handle information and an IoT message can include higher-level information. Furthermore, PTL 1 also describes that this message includes context information, such as a location where data occurs, and the context information can be monitored by another entity or service in the network (e.g., context broker service).

In addition, PTL 2 describes an unauthorized access prevention system that prevents an unauthorized operation based on software failure or setting error. The system described in PTL 2 generates event information corresponding to manipulation mediated by a manipulation mediation unit and determines whether to perform the manipulation indicated by the generated event information.

CITATION LIST

Patent Literature

PTL 1: PCT Japanese Translation Patent Publication No. 2016-524844
PTL 2: Japanese Patent Application Laid-Open No. 2004-287810

SUMMARY OF INVENTION

Technical Problem

For example, it is preferable that data relating to an Individual Number (Social Security and Tax Number) manages a distribution history of data itself. However, PTL 1 describes monitoring the context information but does not describe a method of monitoring a distribution history of the data itself. Furthermore, in the system described in PTL 2, the event information corresponding to the manipulation is generated. However, there is no description about management of a history of data itself used for such manipulation, in PTL 2.

Therefore, an object of the present invention is to provide a distribution history management system, a distribution history management device, a distribution history management method, and a distribution history management program that can appropriately manage a distribution history of data.

Solution to Problem

A distribution history management system according to the present invention includes a data tracking unit that tracks data and at least one component that processes data, in which the data tracking unit includes: a distribution history storage unit that stores a distribution history of the data; a tracking tag adding unit that adds a tracking tag used to identify tracking data; a first transmission unit that transmits data to which the tracking tag is added to the component; and a history registration unit that registers, in the distribution history storage unit, a distribution history of the data to which the tracking tag is added, the component includes a second transmission unit that transmits data to which the same tracking tag as a tracking tag added to data received is added, to another component or the data tracking unit, and the history registration unit registers a result of tracking of data associated with the same tracking tag, as the distribution history of the data, in the distribution history storage unit.

A distribution history management device according to the present invention is a distribution history management device managing a distribution history of data, and the device includes: a distribution history storage unit that stores a distribution history of data; a tracking tag adding unit that adds a tracking tag used to identify tracking data; a first transmission unit that transmits data to which the tracking tag is added, to a component that processes the data; and a history registration unit that registers, in the distribution history storage unit, a distribution history of the data to which the tracking tag is added, in which the history registration unit receives data to which the same tracking tag as a tracking tag added to data received is added from the component that transmits the data to another component or the distribution history management device and registers a result of tracking of data associated with the same tracking tag, as the distribution history of the data, in the distribution history storage unit.

A distribution history management method according to the present invention includes: adding, by a data tracking unit that tracks data, a tracking tag used to identify tracking data; transmitting, by the data tracking unit, data to which the tracking tag is added to a component that processes data; transmitting, by the component, data to which the same tracking tag as a tracking tag added to the data received is added, to the data tracking unit or another component having the same structure as the component; registering, by the data tracking unit, a distribution history of the data to which the tracking tag is added, in a distribution history storage unit that stores a distribution history of the data; and upon registration of the distribution history of the data, registering, by the data tracking unit, a result of tracking of data associated with the same tracking tag, as the distribution history of the data, in the distribution history storage unit.

Another distribution history management method according to the present invention includes: adding a tracking tag used to identify tracking data; transmitting data to which the tracking tag is added to a component that processes the data; receiving from the component data to which a tracking tag the same as the tracking tag is added; registering a distribution history of the data to which the tracking tag is added, in a distribution history storage unit that stores a distribution history of data; and registering, upon registration of the distribution history of the data, a result of tracking of data associated with the same tracking tag, as the distribution history of the data, in the distribution history storage unit.

A distribution history management program according to the present invention causes a computer to: perform a tracking tag adding process of adding a tracking tag used to identify tracking data, a first transmission process of transmitting data to which the tracking tag is added to a component that processes the data, and a history registration process of registering a distribution history of the data to which the tracking tag is added in a distribution history storage unit that stores a distribution history of data; and receive, in the history registration process, data to which the same tracking tag as a tracking tag added to data received is added from the component that transmits the data to the data tracking unit or another component having the same structure as the component, and register a result of tracking of data associated with the same tracking tag, as the distribution history of the data, in the distribution history storage unit.

Advantageous Effects of Invention

According to the present invention, a distribution history of data can be appropriately managed.

DESCRIPTION OF EMBODIMENTS

Exemplary embodiments of the present invention will be described below with reference to the drawings. In the present exemplary embodiment, it is assumed that a flow of data is tracked in an IoT platform in which a plurality of components works together.

Exemplary Embodiment 1

Figure 1:
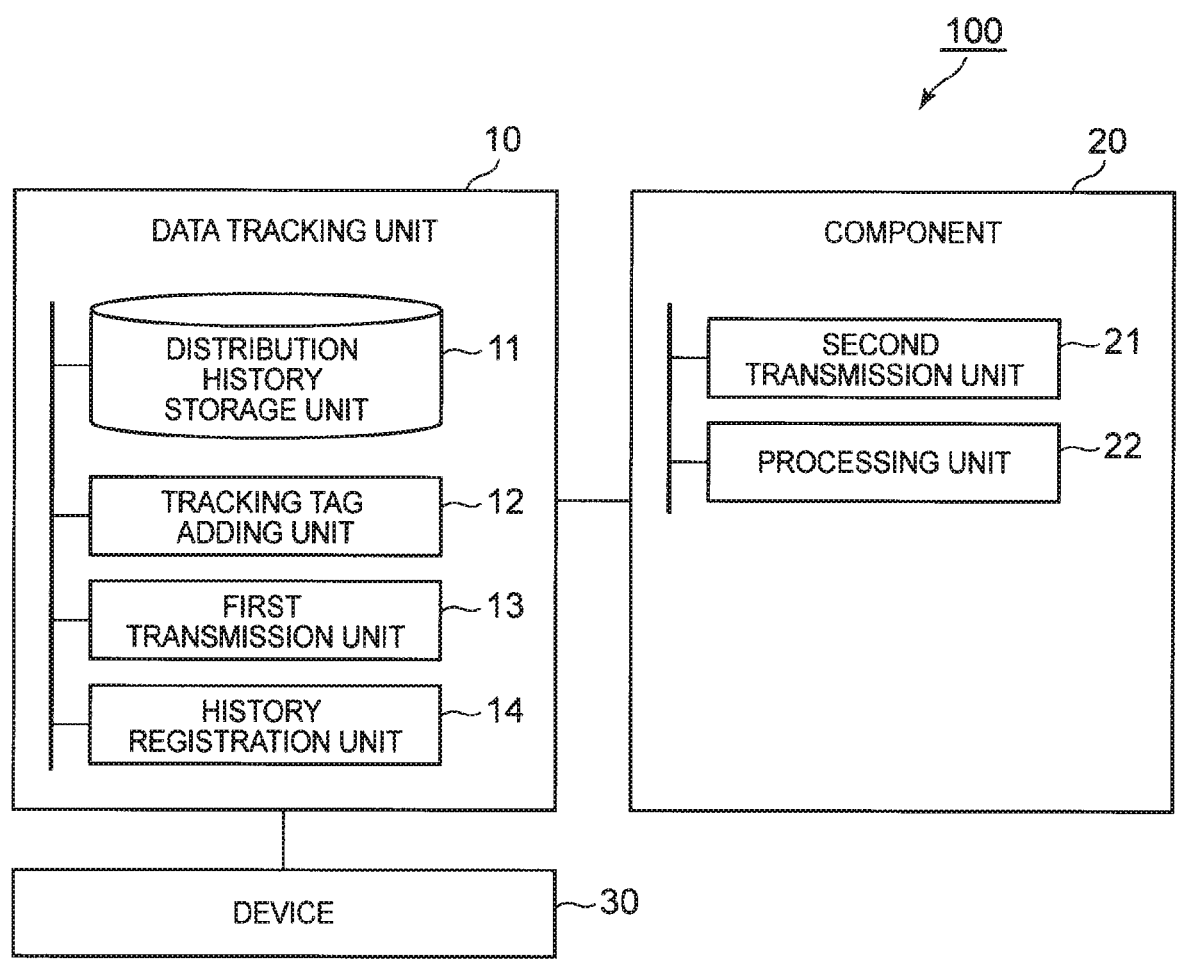
FIG. 1 It depicts a block diagram illustrating a configuration example of a distribution history management system according to a first exemplary embodiment of the present invention.

FIG. 1 is a block diagram illustrating a configuration example of a distribution history management system according to a first exemplary embodiment of the present invention. A distribution history management system 100 according to the present exemplary embodiment includes a data tracking unit 10 and a component 20.

The data tracking unit 10 has a function of tracking data. For example, in future internet WARE (FIWARE), which is an example of an IoT platform, Context Broker is the center of data distribution. The data tracking unit 10 according to the present exemplary embodiment may be achieved, for example, as part of Context Broker. In addition, the data tracking unit 10 may be achieved by a repeater such as a router.

The component 20 is a component element of a system for processing data. Specifically, the component 20 includes a source from which data is generated, an application through which data passes, a destination in which the data is stored, and the like. The component 20 may operate on the same computer as the data tracking unit 10 or may operate on a virtualized computer on the same computer. In this case, the component 20 and the data tracking unit 10 communicate using interprocess communication, shared memory, file, and the like. Furthermore, the component 20 may operate on a different computer from that of the data tracking unit 10. In this case, the component 20 and the data tracking unit 10 communicate via a network.

Figure 2:
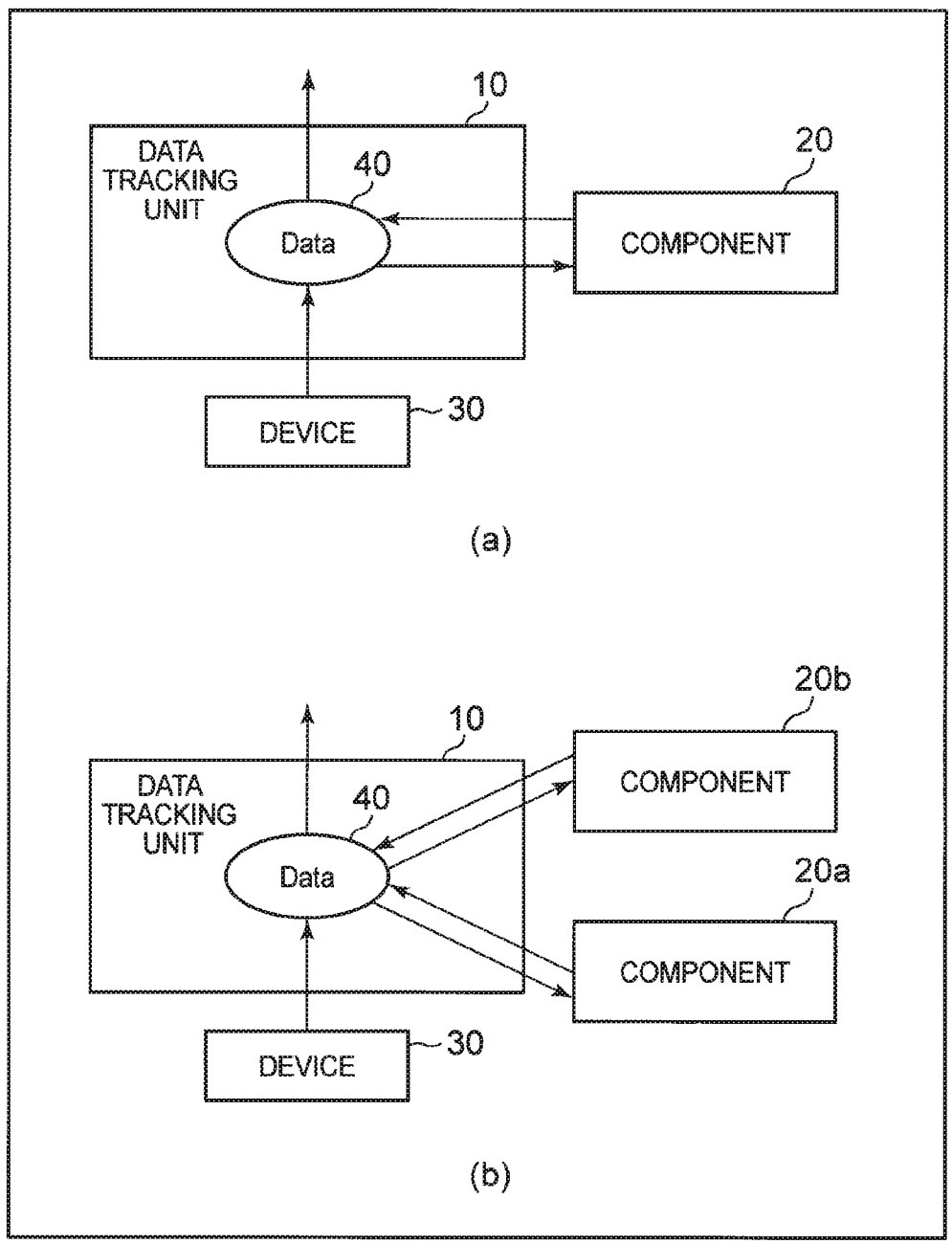
FIG. 2 It depicts explanatory diagrams illustrating examples of flows of data.

Firstly, patterns of flows of data in an IoT platform will be described. FIG. 2 illustrates explanatory diagrams illustrating examples of flows of data. The examples of the flows of data illustrated in FIG. 2 each show a pattern of a flow of overwriting existing data.

Firstly, a flow of data illustrated in FIG. 2(*a*) will be described. Hereinafter, this pattern of the flow of data is referred to as a first pattern. When a device 30 transmits data to the data tracking unit 10, the data tracking unit 10 receives the data and temporarily stores the data in a memory 40. Note that, in the example of FIG. 2(*a*), "Data" in the memory 40 is information, for example, indicating a folder name to be stored or a data storage location. As information indicating the storage location, a column name of a database, a uniform resource locator (URL) being an identifier of a resource used for HTTP, or the like may be used.

When the data tracking unit 10 transmits the data to the component 20, the component 20 performs some processing on the data and returns the data to the data tracking unit 10. The data tracking unit 10 overwrites original data stored in the memory 40 with the returned data. Thereafter, the data tracking unit 10 transmits the data to another component as necessary.

In the present exemplary embodiment, a source ID and a unique ID uniquely identifying data are added to data transmitted from the device 30, enabling identification of a flow of the data transmitted from the device 30. In the following description, identification information given to data may be referred to as a data identifier.

Next, a flow of data illustrated in FIG. 2(*b*) will be described. Hereinafter, this pattern of the flow of data is referred to as a second pattern. As in the flow of data illustrated in FIG. 2(*a*), when the device 30 transmits data to the data tracking unit 10, the data tracking unit 10 receives the data and temporarily stores the data in the memory 40.

Thereafter, when the data tracking unit 10 transmits the data to a component 20*a*, the component 20*a* performs some processing on the data and returns the data to the data tracking unit 10. The data tracking unit 10 overwrites original data stored in the memory 40 with the returned data. Furthermore, the data tracking unit 10 transmits the data to a component 20*b*, and the component 20*b* performs some processing on the data and returns the data to the data tracking unit 10. The data tracking unit 10 overwrites the original data stored in the memory 40 with the returned data. The overwriting of the data performed here may include not only a process of simply replacing the contents of the data but also a process of adding or deleting the contents of the data.

Figure 3:
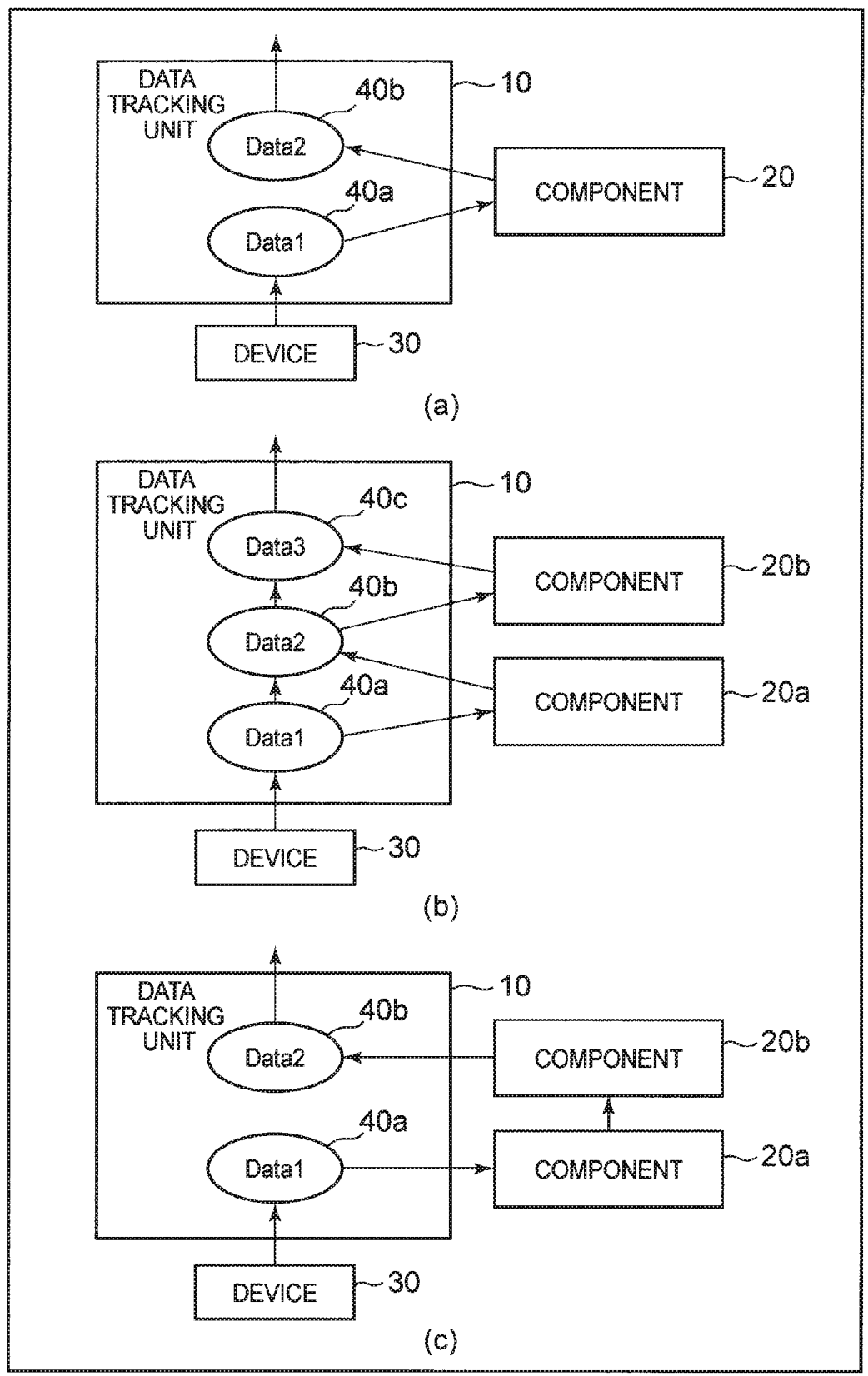
FIG. 3 It depicts explanatory diagrams illustrating other examples of flows of data.

FIG. 3 illustrates explanatory diagrams illustrating other examples of flows of data. The examples of the flows of data illustrated in FIG. 3 each show a pattern of a flow in which new data is generated from existing data.

Firstly, a flow of data illustrated in FIG. 3(*a*) will be described. Hereinafter, this pattern of the flow of data is referred to as a third pattern. As in the flow of data illustrated in FIG. 2(*a*), when the device 30 transmits data to the data tracking unit 10, the data tracking unit 10 receives the data and temporarily stores the data in a memory 40*a*.

Thereafter, when the data tracking unit 10 transmits the data to the component 20, the component 20 generates new data based on the data received and transmits the generated data to the data tracking unit 10. The data tracking unit 10 stores the transmitted new data in a memory 40*b*. Thereafter, the data tracking unit 10 transmits the new data to another component as necessary.

Next, a flow of data illustrated in FIG. 3(*b*) will be described. Hereinafter, this pattern of the flow of data is referred to as a fourth pattern. As in the flow of data illustrated in FIG. 3(*a*), when the device 30 transmits data to the data tracking unit 10, the data tracking unit 10 receives the data and temporarily stores the data in the memory 40*a*.

Thereafter, when the data tracking unit 10 transmits the data to the component 20*a*, the component 20*a* generates new data based on the data received and transmits the generated data to the data tracking unit 10. The data tracking unit 10 stores the transmitted new data in a memory 40*b*. Furthermore, the data tracking unit 10 transmits the data to the component 20*b*, and the component 20*b* generates new data based on the data received and transmits the generated data to the data tracking unit 10. The data tracking unit 10 stores the transmitted new data in a memory 40*c*. Thereafter, the data tracking unit 10 transmits the new data to another component as necessary.

Next, a flow of data illustrated in FIG. 3(*c*) will be described. Hereinafter, this pattern of the flow of data is referred to as a fifth pattern. As in the flow of data illustrated in FIG. 3(*a*), when the device 30 transmits data to the data tracking unit 10, the data tracking unit 10 receives the data and temporarily stores the data in the memory 40*a*.

Thereafter, when the data tracking unit 10 transmits the data to the component 20*a*, the component 20*a* generates new data based on the data received and transmits the generated data to the component 20*b*. The component 20*b* performs some processing on the data and transmits the data to the data tracking unit 10.

The data tracking unit 10 stores the transmitted new data in a memory 40*b*. Thereafter, the data tracking unit 10 transmits the new data to another component as necessary. Note that the component 20*a* may perform some processing on the data transmitted from the data tracking unit 10 and transmit the data to the component 20*b*, and the component 20*b* may generate new data based on the data received.

In other words, the example of the flow of data illustrated in FIG. 3(*b*) is different from the example of the flow of data illustrated in FIG. 3(*c*), in whether data is transmitted between the components.

Since the examples of the patterns illustrated in FIGS. 2 and 3 are assumed as a pattern of a flow of data, a method of managing histories of flows of data corresponding to these patterns will be described in detail below.

As illustrated in FIG. 1, the data tracking unit 10 includes a distribution history storage unit 11, a tracking tag adding unit 12, a first transmission unit 13, and a history registration unit 14.

The distribution history storage unit 11 stores a distribution history of data. The distribution history storage unit 11 stores, for example, a distribution history for each block of data identified by the data identifier described above. In the present exemplary embodiment, the distribution history of data represents a series of histories associated with certain data and includes not only a history of the certain data itself, but also a history of data from which the certain data is generated and a history of data generated based on the certain data. In other words, in the present exemplary embodiment, combined/divided data are collectively managed as one distribution history.

Examples of combining or dividing data include generation of other data from a plurality of blocks of data, transmission of data to different applications, and the like. Specifically, the distribution history includes data generation time, a user device system (component) from which the data is generated, data forward information, and the like. A specific example of the distribution history will be described later.

The tracking tag adding unit 12 adds a tracking tag used to identify tracking data. In the present exemplary embodiment, the distribution history of data is managed by using the tracking tag. As long as the tracking tag has information not overlapping with those of other data, the data can have any content, for example, including a random value with a sufficiently large number of digits.

The first transmission unit 13 transmits data to which a tracking tag is added, to the component 20.

The history registration unit 14 registers a distribution history of data to which a tracking tag is added, in the distribution history storage unit 11. Specifically, when receiving data from the component 20, the history registration unit 14 registers, as a distribution history of data associated with the same tracking tag, a result of tracking of the data in the distribution history storage unit 11.

Furthermore, as illustrated in FIG. 1, the component 20 includes a second transmission unit 21 and a processing unit 22. The second transmission unit 21 transmits data to which a tracking tag is added, to another component or the data tracking unit 10. Specifically, the second transmission unit 21 adds the same tracking tag as a tracking tag added to data received, to data processed by the component 20 and transmits the data.

The processing unit 22 performs various processing on data received. The processing unit 22 may perform processing of updating data received or may generate other data based on the received data. Furthermore, the processing unit 22 does not need to perform explicit changing processing on the data and may perform processing of relaying the data to another device. In other words, the update processing performed by the processing unit 22 includes processing of temporarily storing data and transmitting the data to another device.

Specific operations of the examples of the first pattern to the fifth pattern indicating the flows of data illustrated in FIGS. 2 and 3 will be described below. FIGS. 4 to 8 are explanatory diagrams illustrating examples of flows of data to which tracking tags are added.

Figure 4:
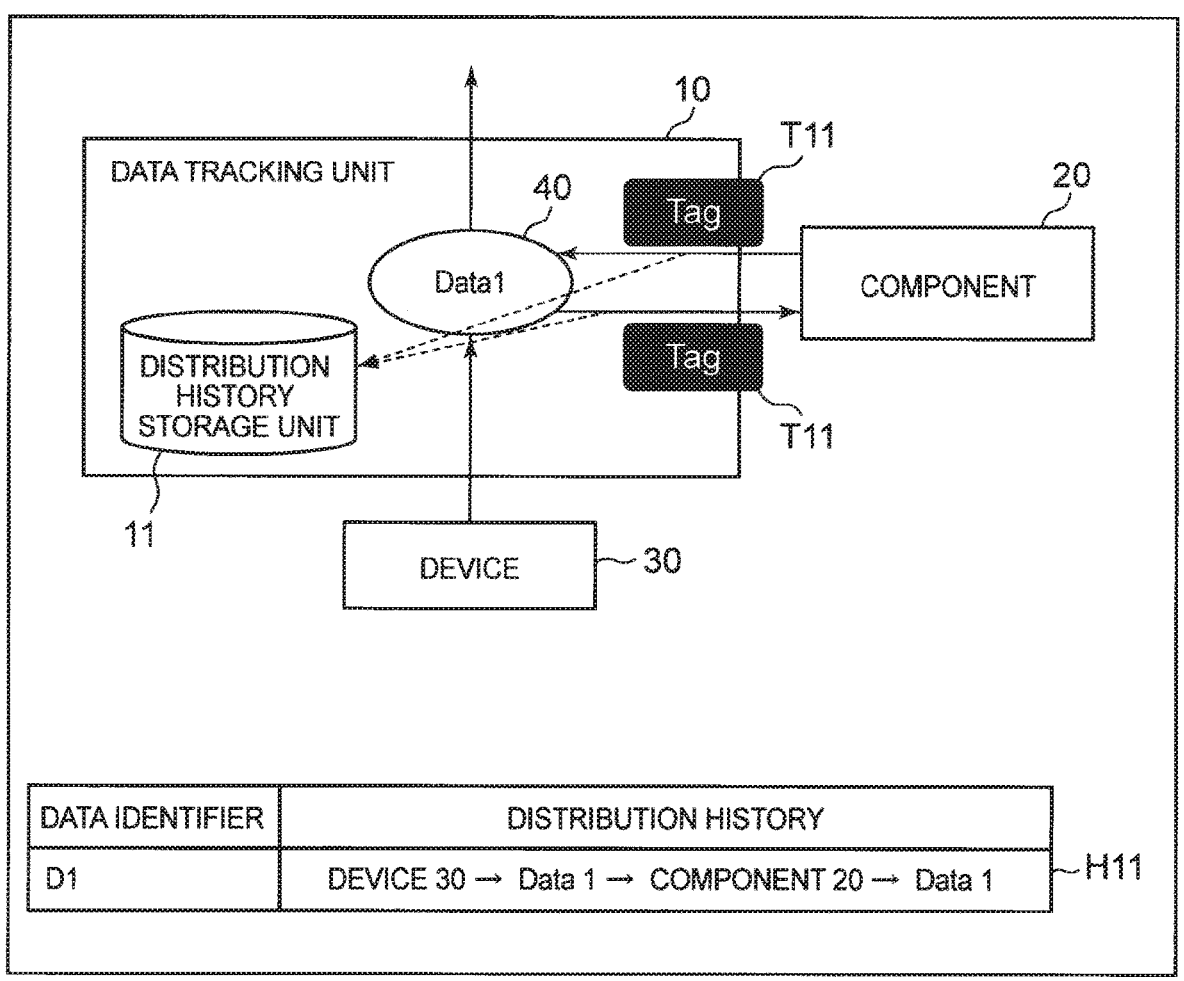
FIG. 4 It depicts an explanatory diagram illustrating an example of a flow of data to which a tracking tag is added.

FIG. 4 illustrates an example of a flow of data corresponding to the first pattern. When the data tracking unit 10 receives data D1 from the device 30, the tracking tag adding unit 12 adds a tracking tag T11 to the received data D1. Furthermore, the history registration unit 14 registers a distribution history of the data D1 to which the tracking tag T11 is added, in the distribution history storage unit 11. Here, since the data D1 is transmitted from the device 30 and temporarily stored in "Data 1" of the memory 40, the history registration unit 14 generates a distribution history "device 30→Data 1" of the data D1 and registers the distribution history in the distribution history storage unit 11.

The first transmission unit 13 transmits the data D1 to which the tracking tag T11 is added, to the component 20. Thereafter, the processing unit 22 of the component 20 performs update processing on the data D1 received. The second transmission unit 21 adds the same tracking tag T11 as the tracking tag added to the received data, to the data D1 processed by the component 20 and transmits the data D1 to the data tracking unit 10. Note that the second transmission unit 21 may transmit the data D1 together with information identifying the component 20 that is a source.

When the data tracking unit 10 receives the data D1, the history registration unit 14 registers the distribution history of the received data D1 in the distribution history storage unit 11. Specifically, when receiving the data D1 to which the tracking tag T11 is added from the component 20, the history registration unit 14 registers a result of tracking of the data D1, as a distribution history of data associated with the same tracking tag T11, in the distribution history storage unit 11.

Here, since the data D1 is transmitted to the component 20, returned therefrom, and temporarily stored in "Data 1" of the memory 40, the history registration unit 14 generates a distribution history "component 20→Data 1" of the data D1. Then, since the tracking tag T11 is added to the data D1, the history registration unit 14 registers a distribution history "device 30→Data 1→component 20→Data 1" of the data D1 associated with the same tracking tag T11. For example, the history registration unit 14 may register a distribution history H11 exemplified in FIG. 4 in the distribution history storage unit 11.

Figure 5:
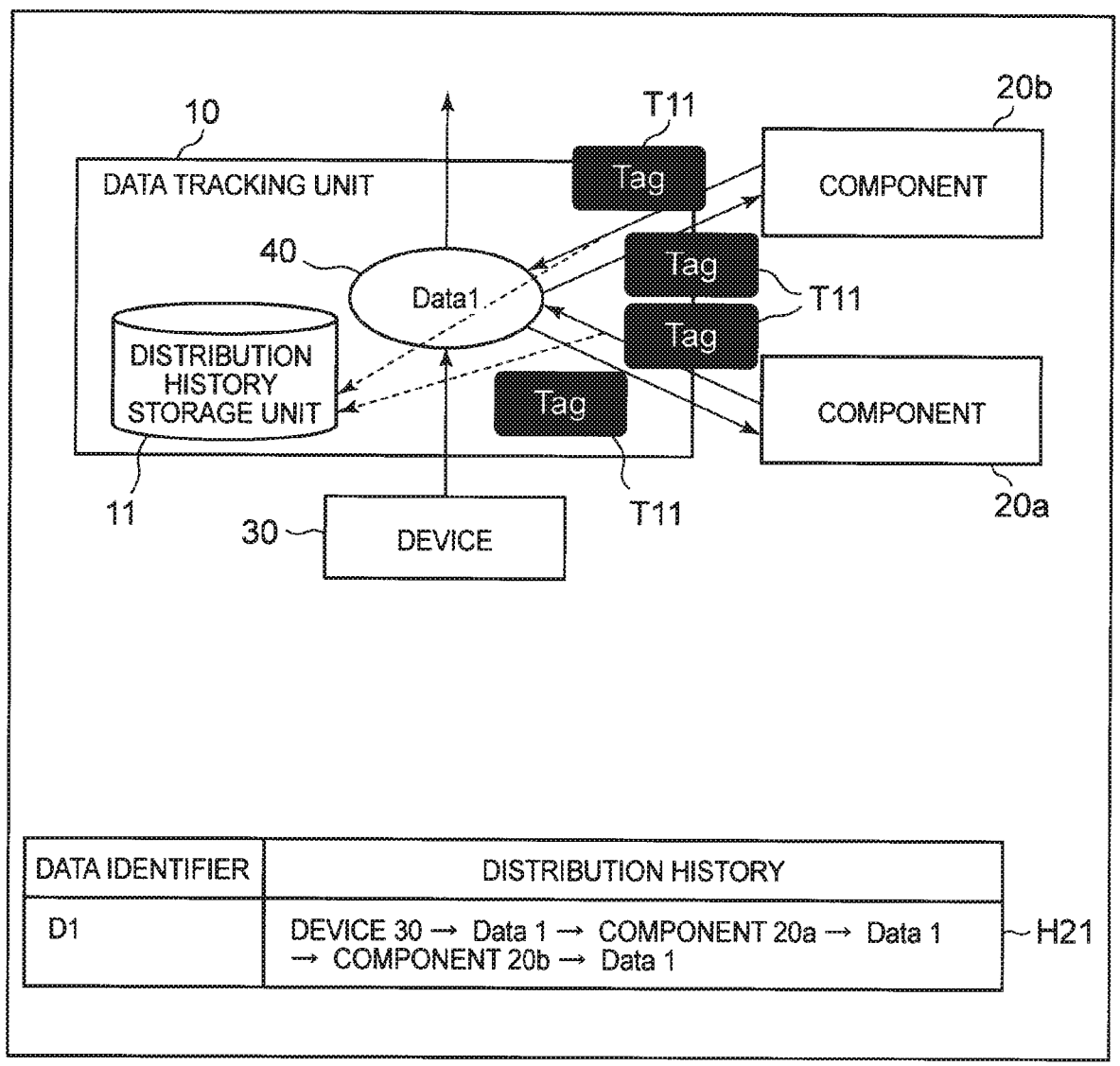
FIG. 5 It depicts an explanatory diagram illustrating an example of a flow of data to which a tracking tag is added.

FIG. 5 illustrates an example of a flow of data corresponding to the second pattern. As in the first pattern illustrated in FIG. 4, when the data tracking unit 10 receives data D1 from the device 30, the tracking tag adding unit 12 adds a tracking tag T11 to the received data D1. Furthermore, the history registration unit 14 registers a distribution history "device 30→Data 1" of the data D1 to which the tracking tag T11 is added, in the distribution history storage unit 11.

The first transmission unit 13 transmits the data D1 to which the tracking tag T11 is added to the component 20a. Thereafter, a processing unit 22 of the component 20a performs update processing on the data D1 received. A second transmission unit 21 adds the same tracking tag T11 as the tracking tag added to the received data, to the data D1 processed by the component 20a and transmits the data D1 to the data tracking unit 10.

When the data tracking unit 10 receives the data D1 to which the tracking tag T11 is added, from the component 20a, the history registration unit 14 registers, in the distribution history storage unit 11, a distribution history "device 30→Data 1→component 20a→Data 1" of the data D1 associated with the same tracking tag T11.

Furthermore, the first transmission unit 13 transmits the data D1 to which the tracking tag T11 is added to the component 20b. Thereafter, the processing unit 22 of the component 20b performs update processing on the data D1 received. The second transmission unit 21 adds the same tracking tag T11 as the tracking tag added to the received data, to the data D1 processed by the component 20b and transmits the data D1 to the data tracking unit 10.

When the data tracking unit 10 receives the data D1 to which the tracking tag T11 is added, from the component 20b, the history registration unit 14 registers, in the distribution history storage unit 11, a distribution history "device 30→Data 1→component 20a→Data 1→component 20b→Data 1" of the data D1 associated with the same tracking tag T11. For example, the history registration unit 14 may register a distribution history H21 exemplified in FIG. 5 in the distribution history storage unit 11.

Figure 6:
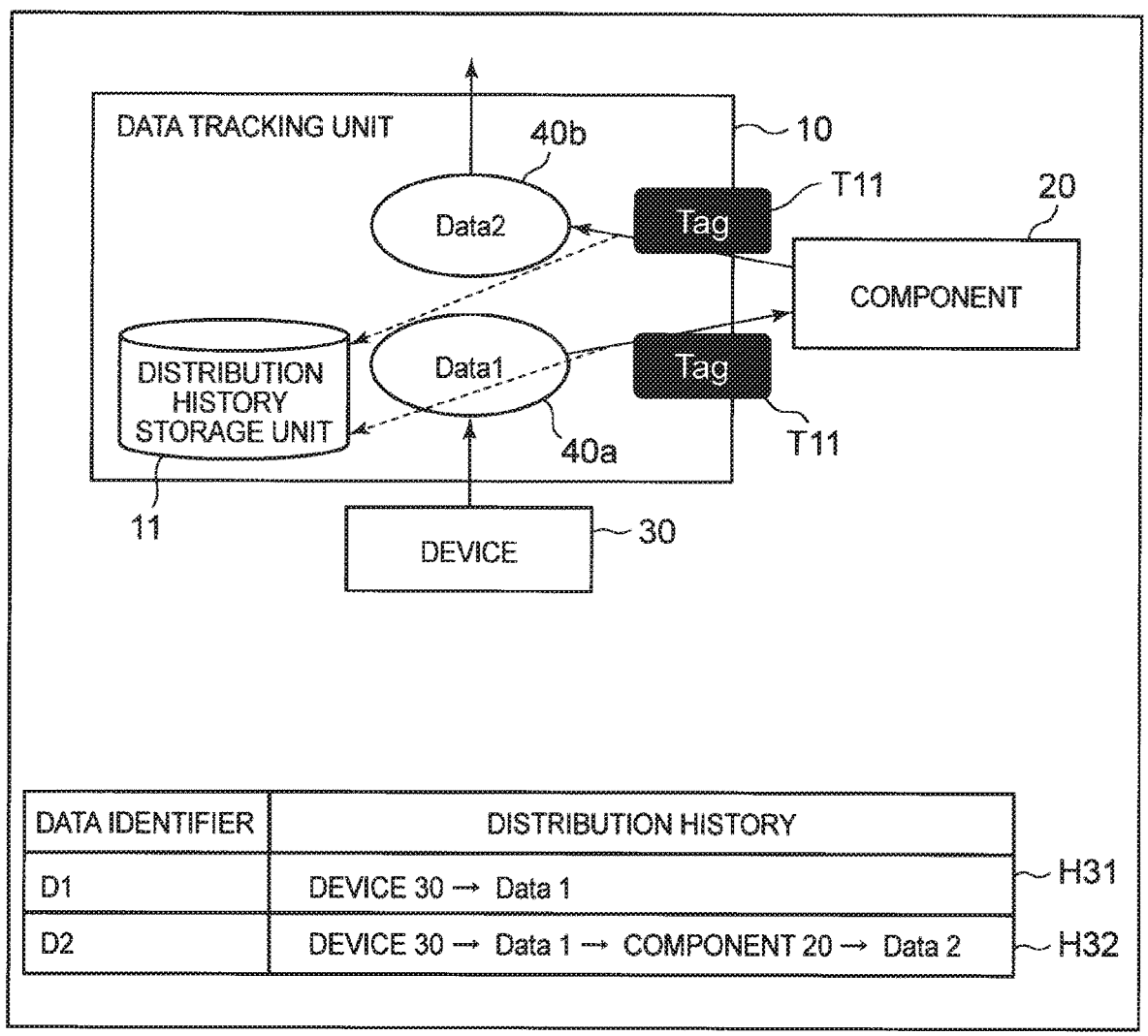
FIG. 6 It depicts an explanatory diagram illustrating an example of a flow of data to which a tracking tag is added.

FIG. 6 illustrates an example of a flow of data corresponding to the third pattern. As in the first pattern illustrated in FIG. 4, when the data tracking unit 10 receives data D1 from the device 30, the tracking tag adding unit 12 adds a tracking tag T11 to the received data D1. Furthermore, the history registration unit 14 registers a distribution history "device 30→Data 1" of the data D1 to which the tracking tag T11 is added, in the distribution history storage unit 11.

The first transmission unit 13 transmits the data D1 to which the tracking tag T11 is added, to the component 20. Thereafter, the processing unit 22 of the component 20 generates new data D2 based on the data D1 received. The second transmission unit 21 adds the same tracking tag T11 as the tracking tag added to the received data to the data D2 generated by the component 20 and transmits the data D2 to the data tracking unit 10.

When the data tracking unit 10 receives the data D2 to which the tracking tag T11 is added, from the component 20, the history registration unit 14 registers, in the distribution history storage unit 11, a distribution history "device 30→Data 1→component 20→Data 2" in which the distribution history "device 30→Data 1" of the data D1 is associated with a distribution history "component 20→Data 2" of the data D2, and the data D1 and the data D2 have the same tracking tag T11. For example, the history registration unit 14 may register distribution histories H31 and H32 exemplified in FIG. 5 in the distribution history storage unit 11.

Figure 7:
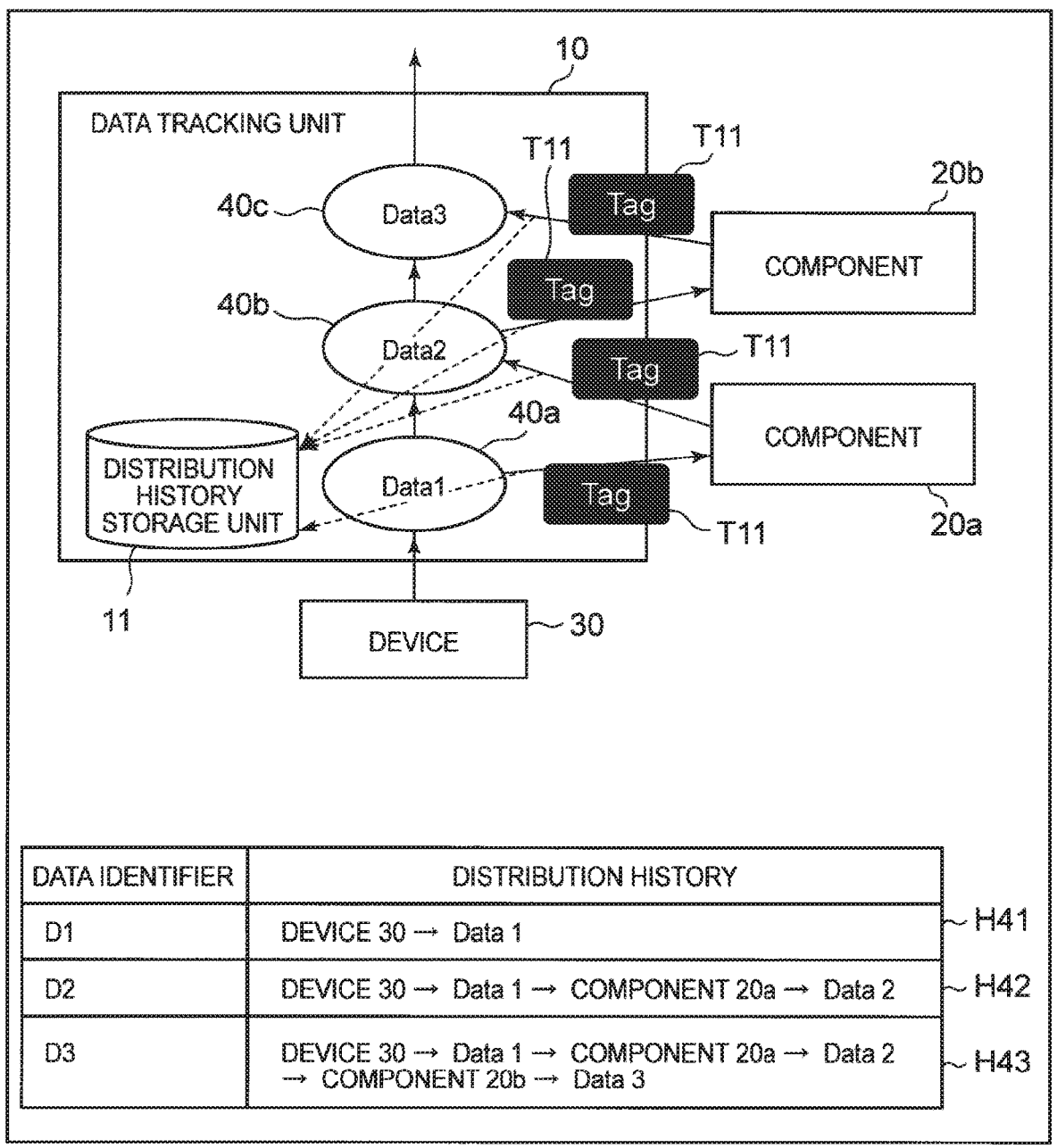
FIG. 7 It depicts an explanatory diagram illustrating an example of a flow of data to which a tracking tag is added.

FIG. 7 illustrates an example of a flow of data corresponding to the fourth pattern. As in the third pattern illustrated in FIG. 6, when the data tracking unit 10 receives data D1 from the device 30, the tracking tag adding unit 12 adds a tracking tag T11 to the received data D1. Furthermore, the history registration unit 14 registers a distribution history "device 30→Data 1" of the data D1 to which the tracking tag T11 is added, in the distribution history storage unit 11.

The first transmission unit 13 transmits the data D1 to which the tracking tag T11 is added to the component 20a. Thereafter, the processing unit 22 of the component 20a generates new data D2 based on the data D1 received. A second transmission unit 21 adds the same tracking tag T11 as the tracking tag added to the received data to the data D2 generated by the component 20a and transmits the data D2 to the data tracking unit 10.

When the data tracking unit 10 receives the data D2 to which the tracking tag T11 is added from the component 20a, the history registration unit 14 registers, in the distribution history storage unit 11, a distribution history "device 30→Data 1→component 20a→Data 2" in which the distribution history "device 30→Data 1" of the data D1 is associated with a distribution history "component 20a→Data 2" of the data D2, and the data D1 and the data D2 have the same tracking tag T11.

Furthermore, the first transmission unit 13 transmits the data D2 to which the tracking tag T11 is added, to the component 20b. Thereafter, a processing unit 22 of the component 20b generates new data D3 based on the data D2 received. A second transmission unit 21 adds the same tracking tag T11 as the tracking tag added to the received data to the data D3 generated by the component 20b and transmits the data D3 to the data tracking unit 10.

When the data tracking unit 10 receives the data D3 to which the tracking tag T11 is added, from the component 20b, the history registration unit 14 registers, in the distribution history storage unit 11, a distribution history "device 30→Data 1→component 20a→Data 2→component 20b→Data3" in which distribution histories of the respective data having the same tracking tag T11 are associated with each other. For example, the history registration unit 14 may register distribution histories H41, H42, and H43 exemplified in FIG. 7 in the distribution history storage unit 11.

Figure 8:
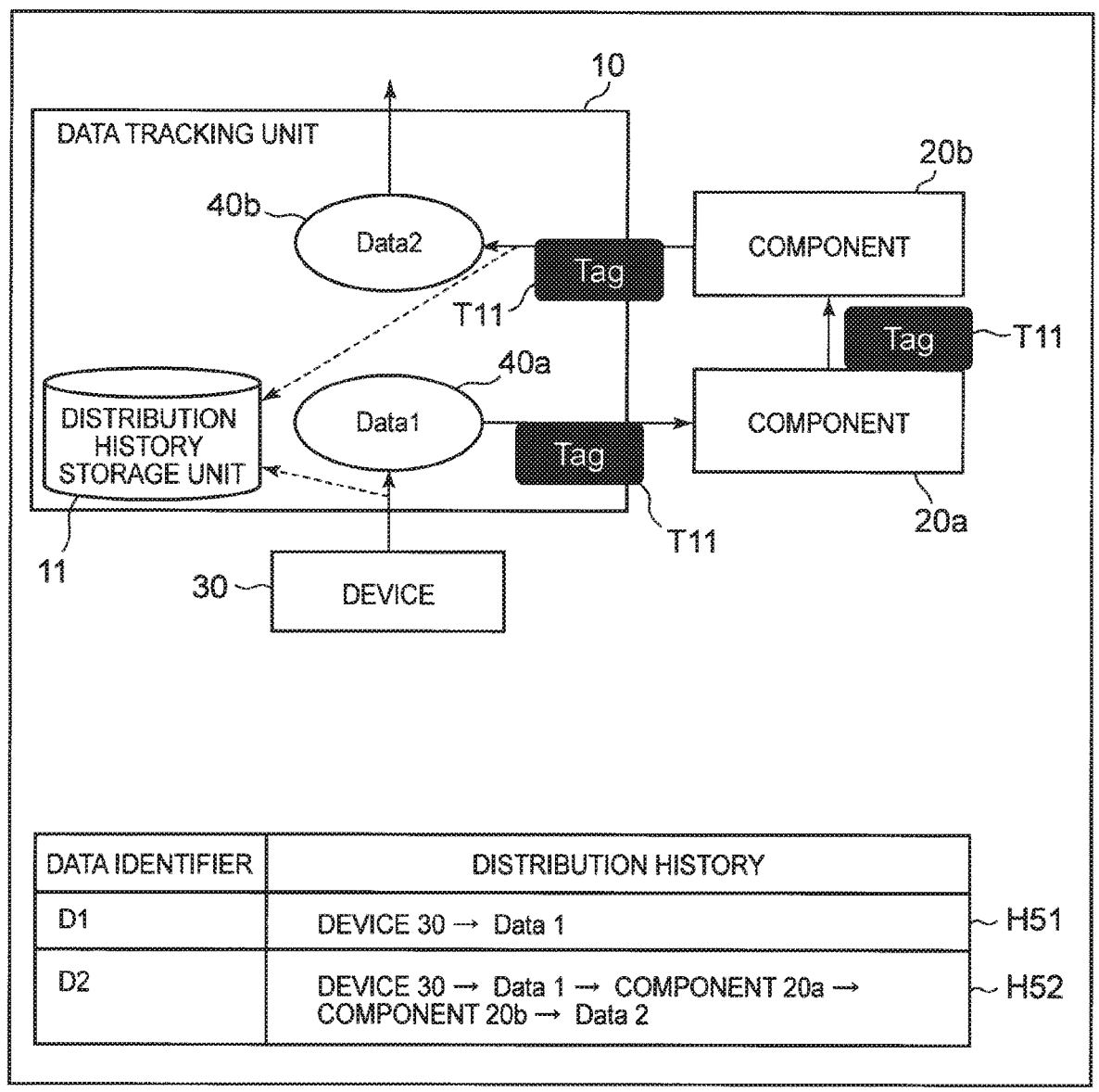
FIG. 8 It depicts an explanatory diagram illustrating an example of a flow of data to which a tracking tag is added.

FIG. 8 illustrates an example of a flow of data corresponding to the fifth pattern. As in the third pattern illustrated in FIG. 6, when the data tracking unit 10 receives data D1 from the device 30, the tracking tag adding unit 12 adds a tracking tag T11 to the received data D1. Furthermore, the history registration unit 14 registers a distribution history "device 30→Data 1" of the data D1 to which the tracking tag T11 is added, in the distribution history storage unit 11.

The first transmission unit 13 transmits the data D1 to which the tracking tag T11 is added to the component 20a. Thereafter, the processing unit 22 of the component 20a generates new data D2 based on the data D1 received. The second transmission unit 21 of the component 20a adds the same tracking tag T11 as the tracking tag added to the received data to the data D2 generated by the component 20a and transmits the data D2 to the component 20b. At this time, the second transmission unit 21 of the component 20a may transmit the data D2 together with information identifying the component 20a that is a source.

Thereafter, the processing unit 22 of the component 20b performs update processing on the data D2 received. The second transmission unit 21 adds the same tracking tag T11 as the tracking tag added to the received data, to the data D2 processed by the component 20b and transmits the data D2 to the data tracking unit 10.

When the data tracking unit 10 receives the data D2 to which the tracking tag T11 is added, from the component 20b, the history registration unit 14 registers, in the distribution history storage unit 11, a distribution history "device 30→Data 1→component 20a→component 20b→Data 2" in which distribution histories of the respective data having the same tracking tag T11 are associated with each other. For example, the history registration unit 14 may register distribution histories H51 and H52 exemplified in FIG. 8 in the distribution history storage unit 11.

The tracking tag adding unit 12, the first transmission unit 13, and the history registration unit 14 are achieved by a CPU of a computer operating according to a program (distribution history management program). For example, the program is stored in a storage unit (not illustrated) included in the data tracking unit 10, a CPU reads the program and may operate, according to the program, as the tracking tag adding unit 12, the first transmission unit 13, and the history registration unit 14. Furthermore, each of the tracking tag adding unit 12, the first transmission unit 13, and the history registration unit 14 may be achieved by dedicated hardware. The distribution history storage unit 11 is achieved, for example, by a magnetic disk device or the like. Furthermore, the data tracking unit 10 according to the present exemplary embodiment can be achieved as a device managing the distribution histories of data as a whole and can be said to be a distribution history management device.

Likewise, the second transmission unit 21 and the processing unit 22 are also achieved by the CPU of the computer operating according to a program. For example, the program may be stored in a storage unit (not illustrated) included in the component 20 and the CPU reads the program and may operate as the second transmission unit 21 and the processing unit 22 according to the program. Furthermore, each of the second transmission unit 21 and the processing unit 22 may be achieved by dedicated hardware.

Figure 9:
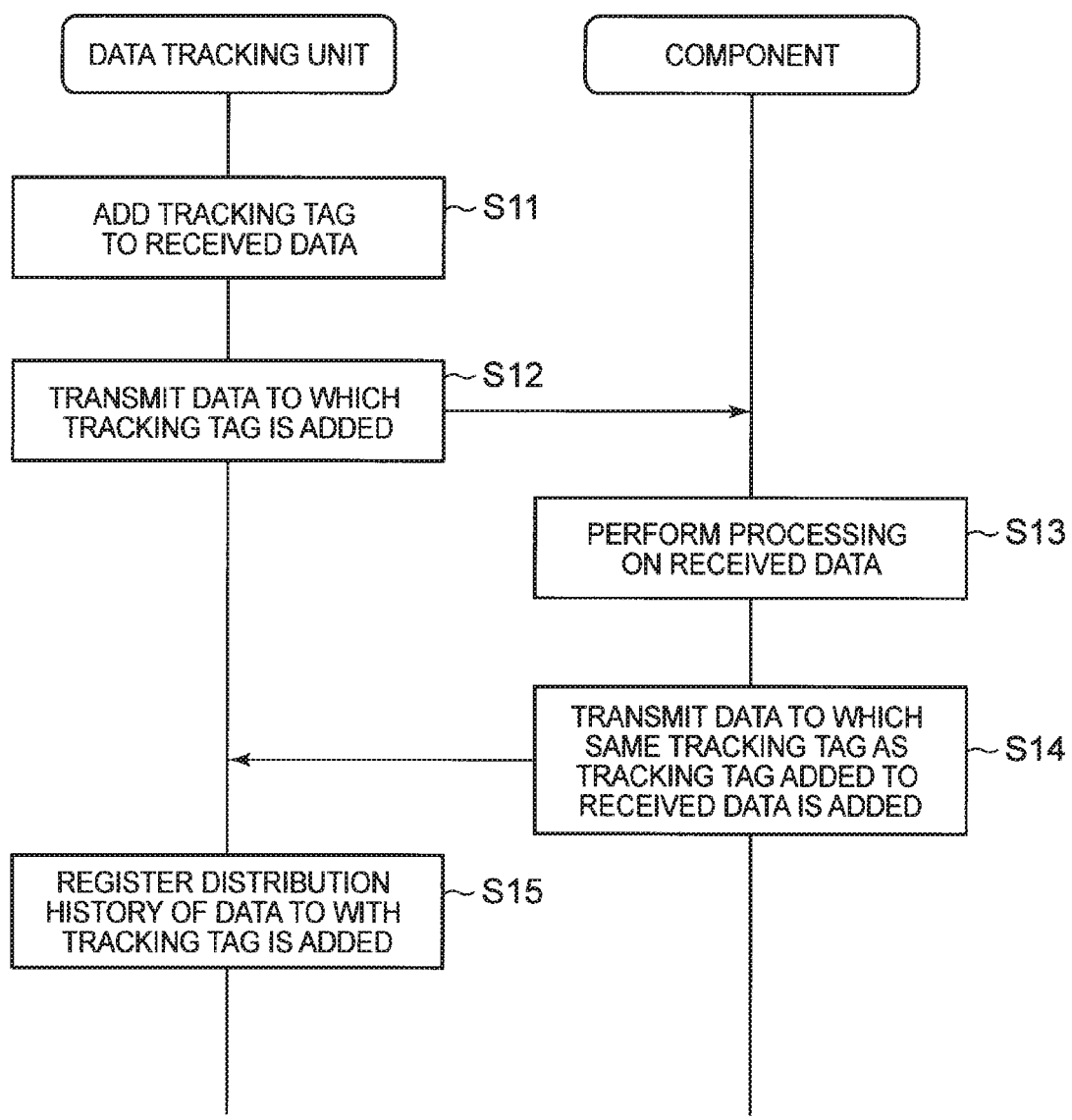
FIG. 9 It depicts a flowchart illustrating an operation example of the distribution history management system according to the first exemplary embodiment.

Next, the operation of the distribution history management system according to the present exemplary embodiment will be described. FIG. 9 is a flowchart illustrating an operation example of the distribution history management system according to the present exemplary embodiment. The tracking tag adding unit 12 of the data tracking unit 10 adds a tracking tag to received data (step S11). The first transmission unit 13 transmits the data to which the tracking tag is added to the component 20 (step S12).

When the component 20 receives the data, the processing unit 22 performs processing on the received data (step S13). The processing unit 22 may perform update processing on the received data or generate new data based on the received data.

The second transmission unit 21 transmits data to which the same tracking tag as the tracking tag added to the received data is added to the data tracking unit 10 (step S14). Note that the second transmission unit 21 may transmit the data to which the tracking tag is added to other components as illustrated in FIG. 8.

When the data tracking unit 10 receives the data, the history registration unit 14 registers a distribution history of the data to which the tracking tag is added, in the distribution history storage unit 11 (step S15). Specifically, the history registration unit 14 registers a result of tracking of data associated with the same tracking tag, as a distribution history of the data, in the distribution history storage unit 11.

As described above, in the present exemplary embodiment, the tracking tag adding unit 12 adds a tracking tag, and the first transmission unit 13 transmits data to which the tracking tag is added, to the component 20. The second transmission unit 21 transmits data to which the same tracking tag as the tracking tag added to the data received is added, to another component 20 or the data tracking unit 10. Then, the history registration unit 14 registers a distribution history of the data to which the tracking tag is added, in the distribution history storage unit 11. At that time, the history registration unit 14 registers a result of tracking of data associated with the same tracking tag, as a distribution history of data, in the distribution history storage unit 11. Therefore, the distribution history of data can be appropriately managed.

Next, a modification of the distribution history management system according to the present exemplary embodiment will be described. In the first exemplary embodiment, the first pattern to the fifth pattern of the flows of data have been described. In this modification, two patterns of flows of data will be further described.

Figure 10:
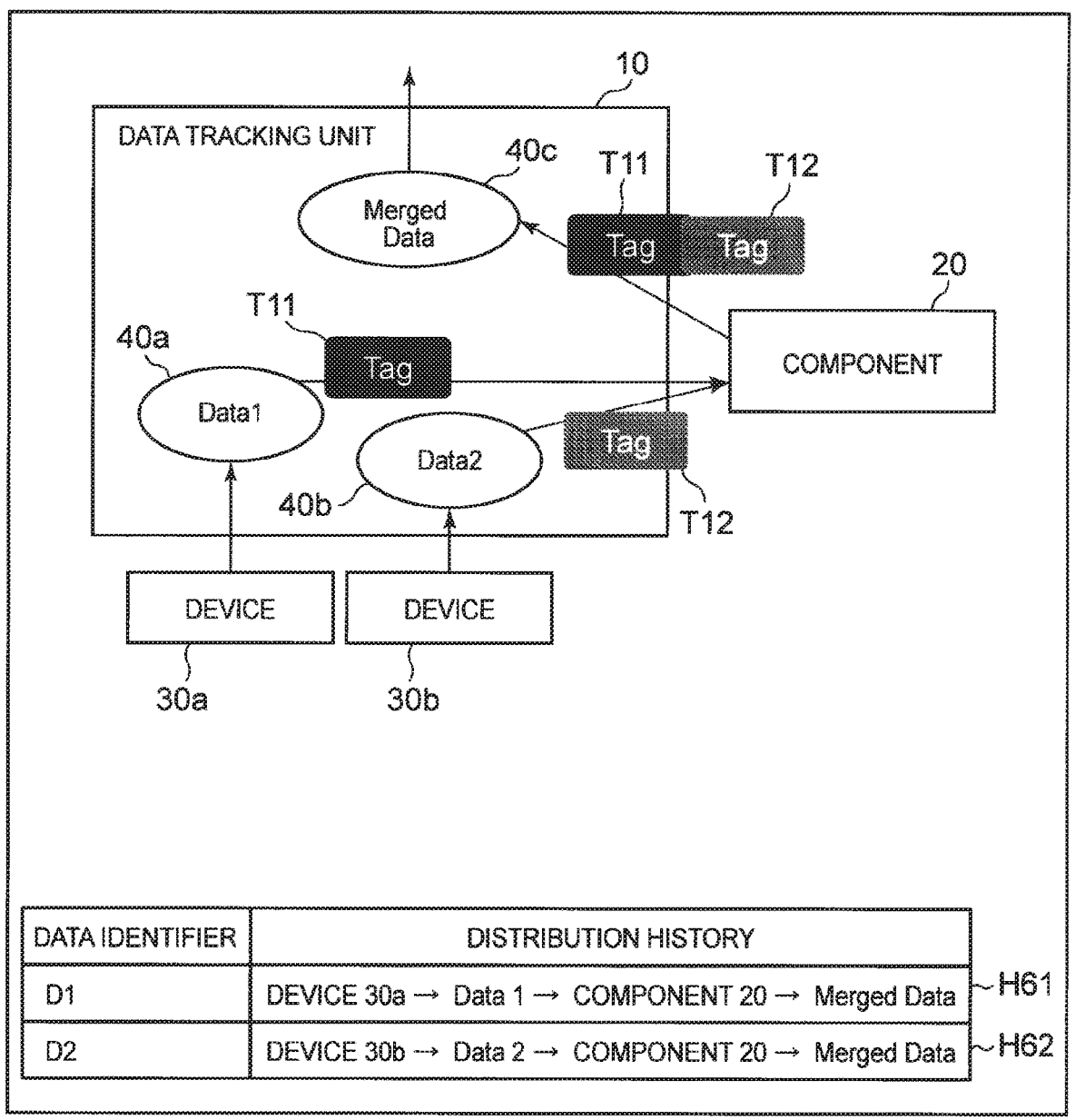
FIG. 10 It depicts an explanatory diagram illustrating an example of a flow of data.
Figure 11:
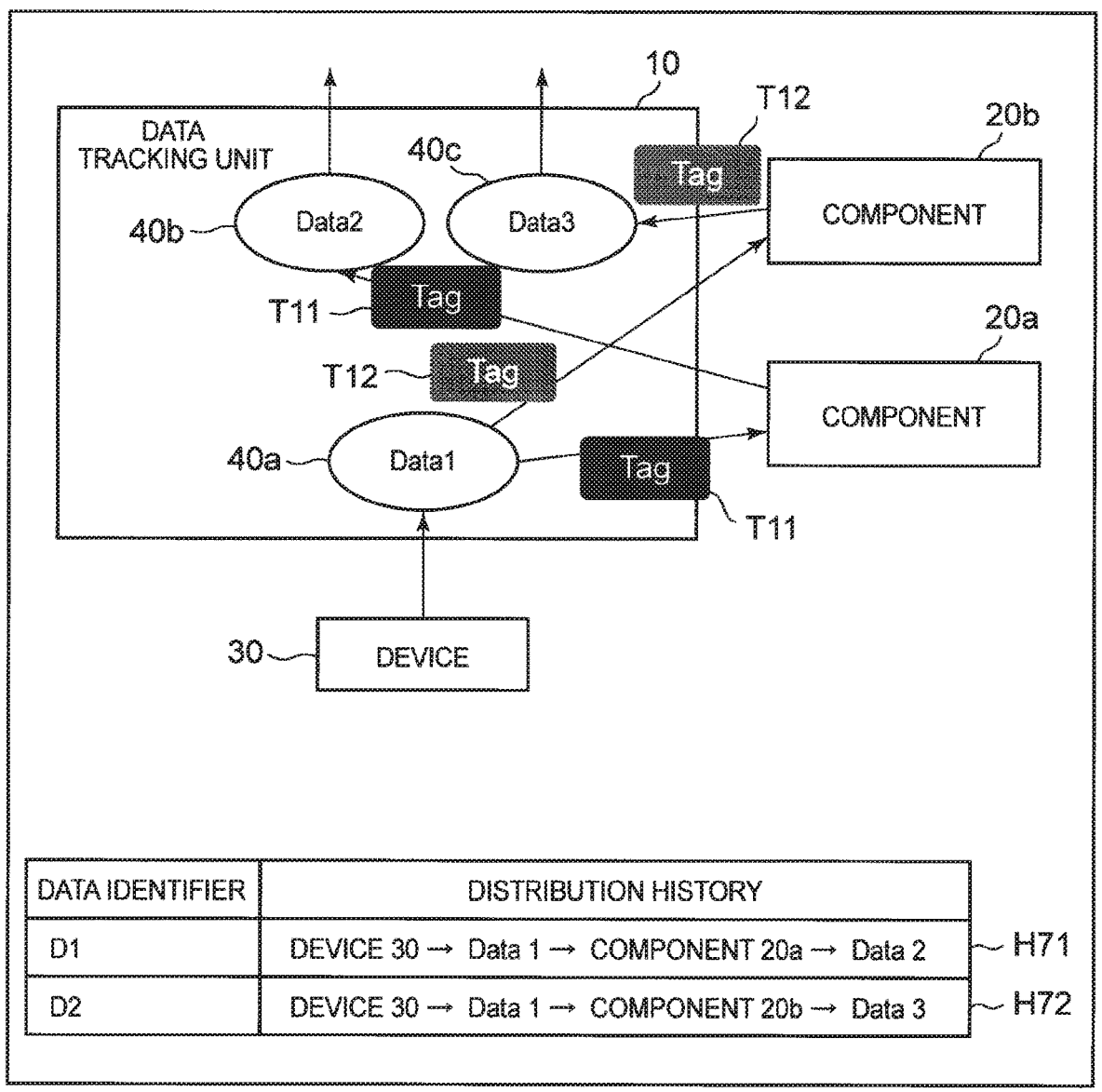
FIG. 11 It depicts an explanatory diagram illustrating an example of a flow of data.

FIGS. 10 and 11 are each an explanatory diagram illustrating an example of a flow of data. Firstly, a flow of data illustrated in FIG. 10 will be described. Hereinafter, this pattern of the flow of data is referred to as a sixth pattern. In the sixth pattern, an example of processing is shown in which a plurality of blocks of data transmitted from a plurality of devices 30a and devices 30b is combined into one block of data by the component 20.

When the data tracking unit 10 receives data D1 and data D2 from the plurality of devices 30a and 30b, respectively, the tracking tag adding unit 12 adds a tracking tag T11 to the received data D1 and adds a tag T12 to the received data D2. In other words, the tracking tag adding unit 12 adds different tags to the respective received data.

Furthermore, the history registration unit 14 registers a distribution history of the data D1 to which the tracking tag T11 is added, in the distribution history storage unit 11 and registers a distribution history of the data D2 to which the tracking tag T12 is added, in the distribution history storage unit 11. Here, since the data D1 is transmitted from the device 30a and temporarily stored in "Data 1" of the memory 40a, the history registration unit 14 generates a distribution history "device 30a→Data 1" of the data D1 and registers the distribution history in the distribution history storage unit 11. Furthermore, since the data D2 is transmitted from the device 30b and temporarily stored in "Data 2" of the memory 40b, the history registration unit 14 generates a distribution history "device 30b→Data 2" of the data D2 and registers the distribution history in the distribution history storage unit 11.

The first transmission unit 13 transmits the data D1 to which the tracking tag T11 is added and the data D1 to which the tracking tag T12 is added to the component 20. Thereafter, the processing unit 22 of the component 20 performs processing of combining the data D1 and data D2 received to generate a combined data D3.

The second transmission unit 21 adds both of the tracking tag T11 added to the received data D1 and the tracking tag T12 added to the received data D2 to the combined data D3 and transmits the data D3 to the data tracking unit 10.

When the data tracking unit 10 receives the data D3 to which the tracking tag T11 and tracking tag T12 are added from the component 20, the history registration unit 14 registers, in the distribution history storage unit 11, a distribution history "device 30a→Data 1→component 20→Merged Data" in which a distribution history "device 30→Data 1" of the data D1 and a distribution history "component 20→Merged Data" of the data D3 are associated with the same tracking tag T11, and the data D1 and the data D3 have the tracking tag T11.

Likewise, the history registration unit 14 registers, in the distribution history storage unit 11, a distribution history "device 30b→Data 2→component 20→Merged Data" in which a distribution history "device 30b→Data 2" of the data D2 and a distribution history "component 20→Merged Data" of the data D3 are associated with the same tracking tag T11 and the data D2 and the data D3 have the tracking tag T12. For example, the history registration unit 14 may register distribution histories H61 and H62 exemplified in FIG. 10 in the distribution history storage unit 11.

Next, a flow of data illustrated in FIG. 11 will be described. Hereinafter, this pattern of the flow of data is referred to as a seventh pattern. In the seventh pattern, an example is shown in which one block of data transmitted from a device is transmitted to a plurality of components 20a and 20b, and the respective processing is performed.

When the data tracking unit 10 receives data D1 from the device 30, the tracking tag adding unit 12 generates data obtained by adding a tracking tag T11 to the received data D1 and further generates data obtained by adding a tag T12 to the data D1. In other words, the tracking tag adding unit 12 generates blocks of data obtained by adding different tags to the received one block of data.

Furthermore, the history registration unit 14 registers a distribution history of the data D1 to which the tracking tag T11 is added, in the distribution history storage unit 11 and registers a distribution history of the data D1 to which the tracking tag T12 is added, in the distribution history storage unit 11 Here, since the data D1 is transmitted from the device 30 and temporarily stored in "Data 1" of the memory 40a, the history registration unit 14 generates a distribution history "device 30→Data 1" of the data D1 and registers the distribution history in the distribution history storage unit 11. Note that in this pattern, since the same data D1 is transmitted to different components, the history registration unit 14 generates two distribution histories "device 30→Data 1" of the data D1 and registers the distribution histories in the distribution history storage unit 11.

The first transmission unit 13 transmits the data D1 to which the tracking tag T11 is added to the component 20a. In addition, the first transmission unit 13 transmits the data D1 to which the tracking tag T11 is added also to the component 20b. Thereafter, the processing units 22 of the component 20a and component 20b perform update processing on the data D1 received.

The second transmission unit 21 of the component 20a adds the same tracking tag T11 as the tracking tag added to the received data, to the data D1 processed by the component 20a and transmits the data D2 to the data tracking unit 10. Likewise, the second transmission unit 21 of the component 20b adds the same tracking tag T12 as the tracking tag added to the received data, to the data D1 processed by the component 20b and transmits the data D2 to the data tracking unit 10.

When the data tracking unit 10 receives the data D1 to which the tracking tag T11 is added from the component 20a, the history registration unit 14 registers, in the distribution history storage unit 11, a distribution history "device 30→Data 1→component 20a→Data 2" in which a distribution history "device 30→Data 1" and a distribution history "component 20a→Data 2" of the data D1 to which the tracking tag T11 is added are associated with the same tracking tag T11.

Likewise, when the data tracking unit 10 receives the data D1 to which the tracking tag T12 is added from the component 20b, the history registration unit 14 registers, in the distribution history storage unit 11, a distribution history "device 30→Data 1→component 20b→Data3" in which a distribution history "device 30→Data 1" and a distribution history "component 20b→Data3" of the data D1 to which the tracking tag T12 is added are associated with the same tracking tag T12. For example, the history registration unit 14 may register distribution histories H71 and H72 exemplified in FIG. 11 in the distribution history storage unit 11.

As described above, when two blocks of data are merged into data by a component, the component returns two tags together with the data, and when one block of data is read by two components, different tags are added, thus enabling tracking.

A specific example of the flow of data shown in the sixth pattern includes calculation of average temperature by a component based on data acquired by a plurality of devices such as temperature sensors. Furthermore, a specific example of the flow of data shown in the seventh pattern includes use of a device, such as a temperature sensor, for different systems, such as air conditioner system or a health management system.

Exemplary Embodiment 2

Next, a distribution history management system according to a second exemplary embodiment of the present invention will be described. In the first exemplary embodiment, a description is made of the method in which after a component processes data, a tracking tag is added to the data. In the present exemplary embodiment, a method will be described in which a component transmits data to which information in addition to the tracking tag is added.

Figure 12:
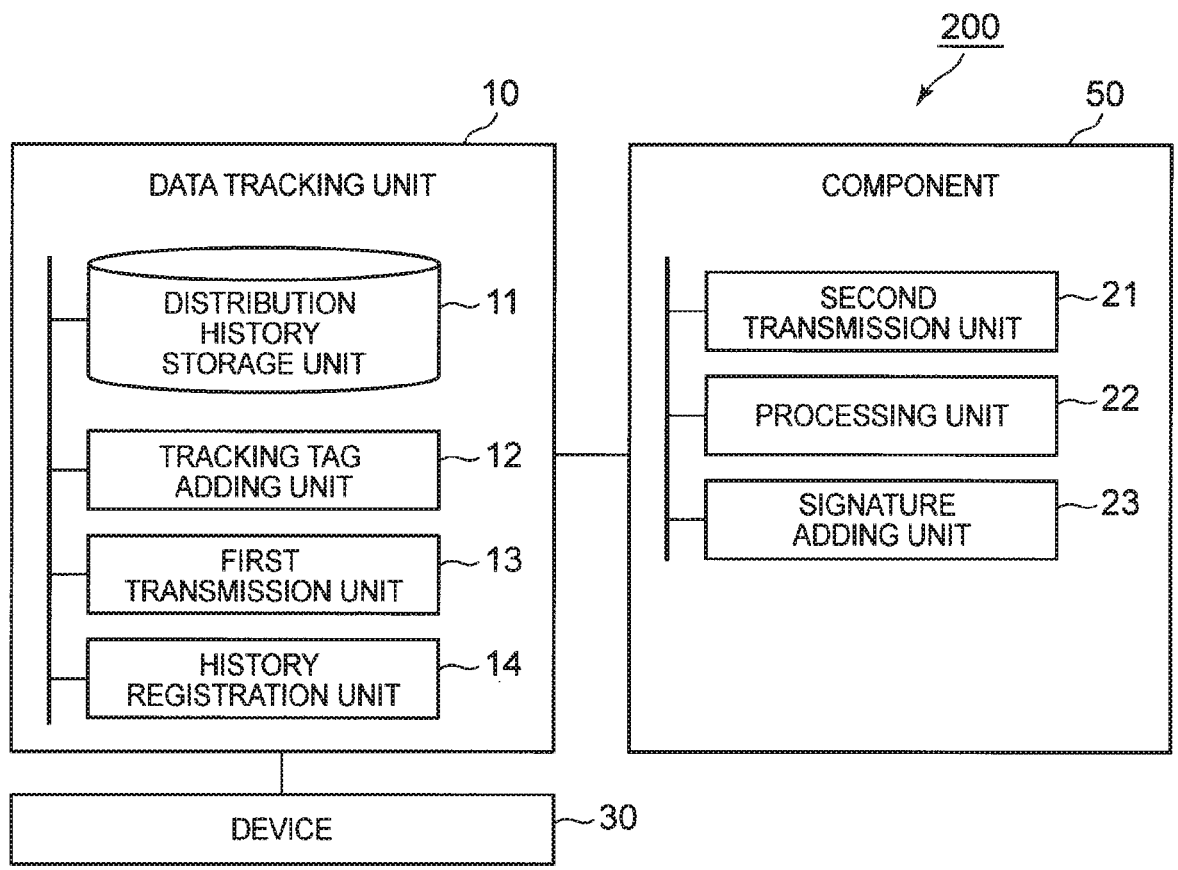
FIG. 12 It depicts a block diagram illustrating a configuration example of a distribution history management system according to a second exemplary embodiment of the present invention.

FIG. 12 is a block diagram illustrating a configuration example of the distribution history management system according to a second exemplary embodiment of the present invention. The distribution history management system 200 according to the present exemplary embodiment includes a data tracking unit 10 and a component 50. The contents of the data tracking unit 10 are the same as those in the first exemplary embodiment.

The component 50 includes a second transmission unit 21, a processing unit 22, and a signature adding unit 23. The contents of the second transmission unit 21 and the processing unit 22 are the same as those in the first exemplary embodiment.

The signature adding unit 23 adds a signature indicating evidence of manipulation performed by the component 50 to data processed by the processing unit 22. An electronic signature added by the signature adding unit 23 has appropriate contents. For example, the signature adding unit 23 may use a digital signature based on a public key cryptosystem. In this case, preferably, the component 50 stores a secret key and the data tracking unit 10 stores the public key. However, the signature added by the signature adding unit 23 is not limited to the digital signature described above.

For example, the signature adding unit 23 may use, as a signature, a message authentication code based on a hash function or common key cryptosystem. In this example, the component 50 and the data tracking unit 10 store a common key. The signature adding unit 23 generates a message authentication code by using, for example, hash-based message authentication code (HMAC) or cipher block chaining message authentication code (CBC-MAC) and adds the code as a signature to data. The HMAC and CBC-MAC are well-known techniques, and a description thereof will be omitted. Data itself or a generated random value (NONCE) may be input to the HMAC or CBC-MAC. In the latter case, output of the NONCE and HMAC/CBC-MAC is used as the signature. To HMAC or CBC-MAC, both of the data and NONCE may be input.

Figure 13:
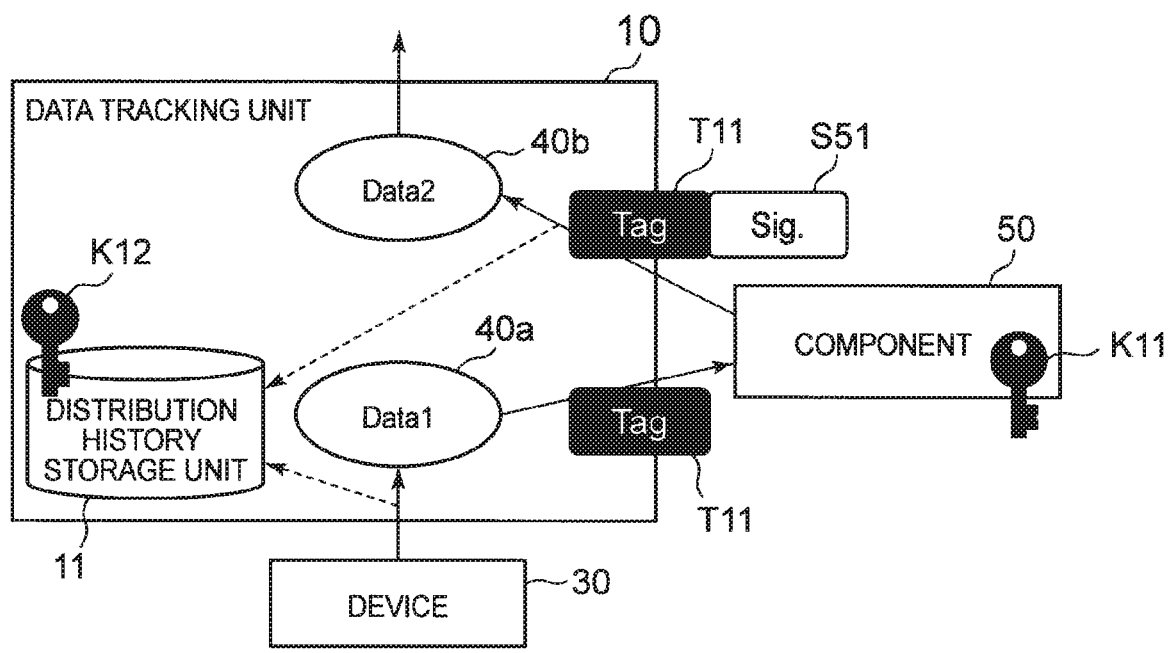
FIG. 13 It depicts an explanatory diagram illustrating an example of an operation for adding a digital signature.

FIG. 13 is an explanatory diagram illustrating an example of an operation for adding a digital signature. When the data tracking unit 10 receives data D1 from a device 30, a tracking tag adding unit 12 adds a tracking tag T11 to the received data D1. Furthermore, a history registration unit 14 registers a distribution history of the data D1 to which the tracking tag T11 is added, in a distribution history storage unit 11.

The first transmission unit 13 transmits the data D1 to which the tracking tag T11 is added, to the component 50. Thereafter, the processing unit 22 of the component 50 performs processing on the data D1 received. To the data processed by the processing unit 22, the signature adding unit 23 adds a signature S51 indicating evidence of manipulation performed by the component 50. The signature adding unit 23 may use a secret key K11 when adding the signature S51. The second transmission unit 21 adds the tracking tag T11 and the signature S51 to the data D1 and transmits the data D1 to the data tracking unit 10.

When the data tracking unit 10 receives the data D1, the history registration unit 14 registers the distribution history of the received data D1 in the distribution history storage unit 11. At this time, the history registration unit 14 may verify the added signature S51 by using a public key K12.

As described above, in the present exemplary embodiment, the signature adding unit 23 adds a signature indicating evidence of manipulation performed by the component 50, to data processed by the processing unit 22, and the second transmission unit 21 transmits the data to which a tracking tag and a signature are added, to another component or the data tracking unit 10. Therefore, in addition to the effects of the first exemplary embodiment, it is possible to give higher evidence that the component has performed a manipulation on data.

Next, a first modification of the present exemplary embodiment will be described. In the second exemplary embodiment, the signature adding unit 23 adds a signature to give higher evidence that data has been manipulated. In the first modification, a method of protecting the component by using a trusted execution environment (TEE) will be described.

Figure 14:
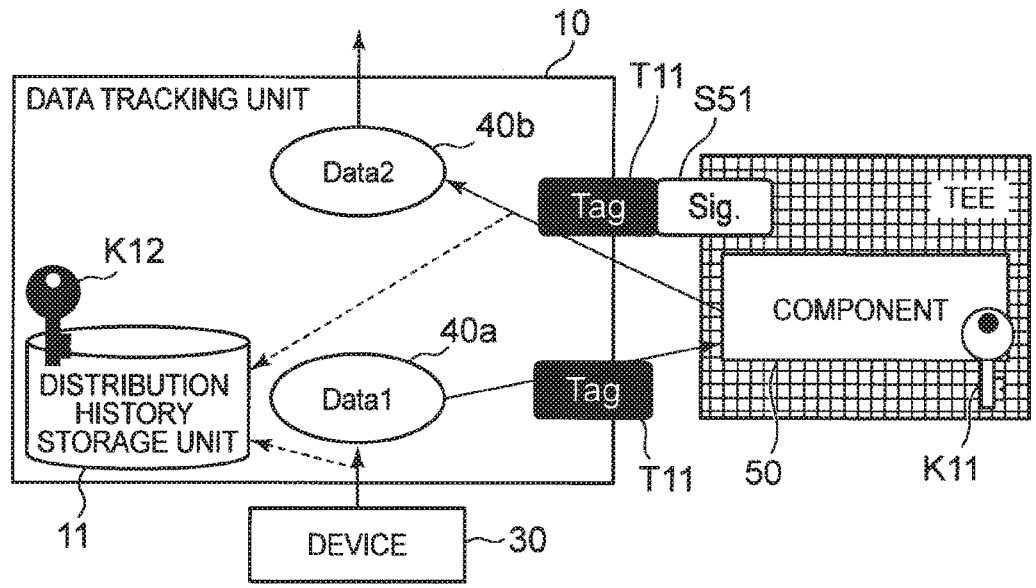
FIG. 14 It depicts an explanatory diagram illustrating an example of an operation for adding a signature by using a TEE.

FIG. 14 is an explanatory diagram illustrating an example of an operation for adding a signature by using the TEE. A flow of data is the same as that illustrated in FIG. 13. However, in the example illustrated in FIG. 14, the component 50 is protected by the TEE. In this case, the signature adding unit 23 adds a signature S51 to data by using a key K11 stored in the TEE, and the second transmission unit 21 transmits the data to the data tracking unit 10. The data tracking unit 10 receiving the data uses a public key K12 to verify the signature S51. Such a configuration can improve the reliability of the data transmitted. In addition, not a verification using a public key cryptography but a message authentication code using a hash function or common key cryptography may be used instead of verification using a public key cryptography.

Figure 15:
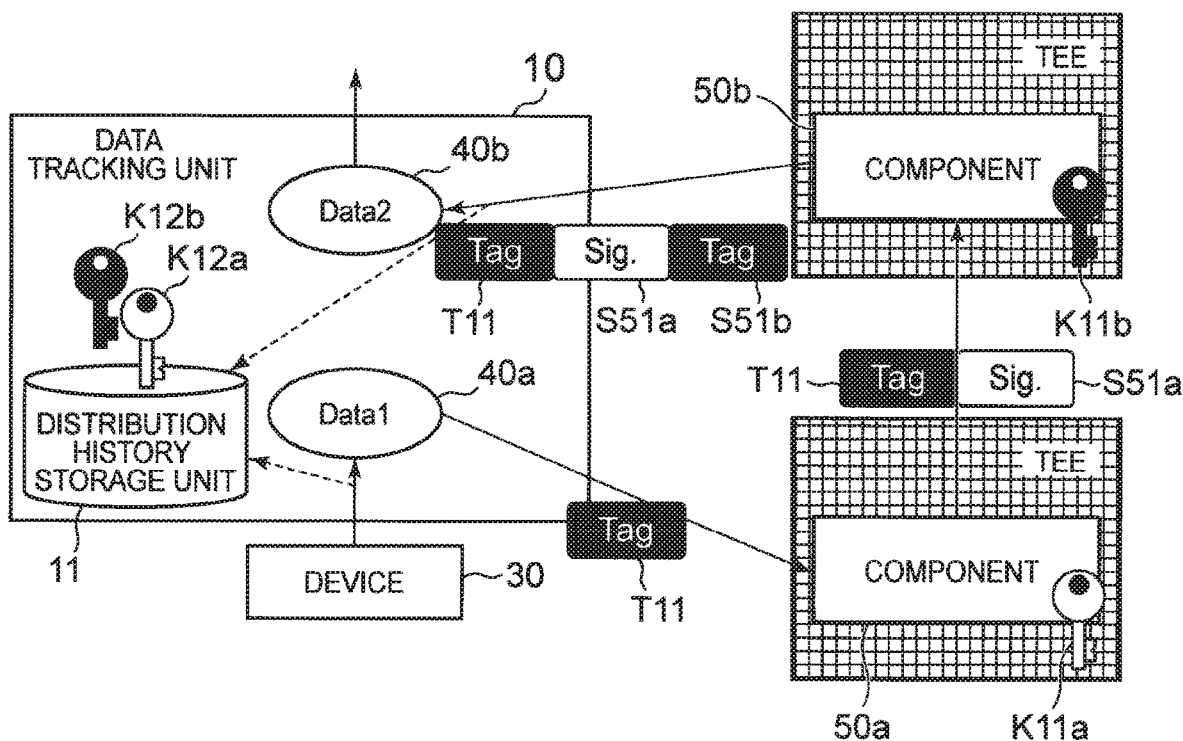
FIG. 15 It depicts an explanatory diagram illustrating an operation example of passing data between components.

FIG. 15 is an explanatory diagram illustrating an operation example of passing data between components. As in the method illustrated in FIG. 14, also in passing data between components, a signature adding unit 23 of a component 50*a* uses a key K11*a* stored in a TEE to add a signature S51*a* to the data, and a processing unit 22 transmits the data to a component 50*b*. Furthermore, a signature adding unit 23 of the component 50*b* uses a key K11*b* stored in the TEE to assign a signature S51*b* to the data, and a second transmission unit 21 transmits the data to the data tracking unit 10. The data tracking unit 10 receiving the data uses public keys K12*a* and K12*b* to verify the signatures S51*a* and S51*b*. Such a configuration can improve the reliability of data transmitted, as well.

As described above, in the first modification, data is guaranteed at a hardware level by protecting the components by using the TEE. Therefore, the reliability of data can be further improved.

Figure 16:
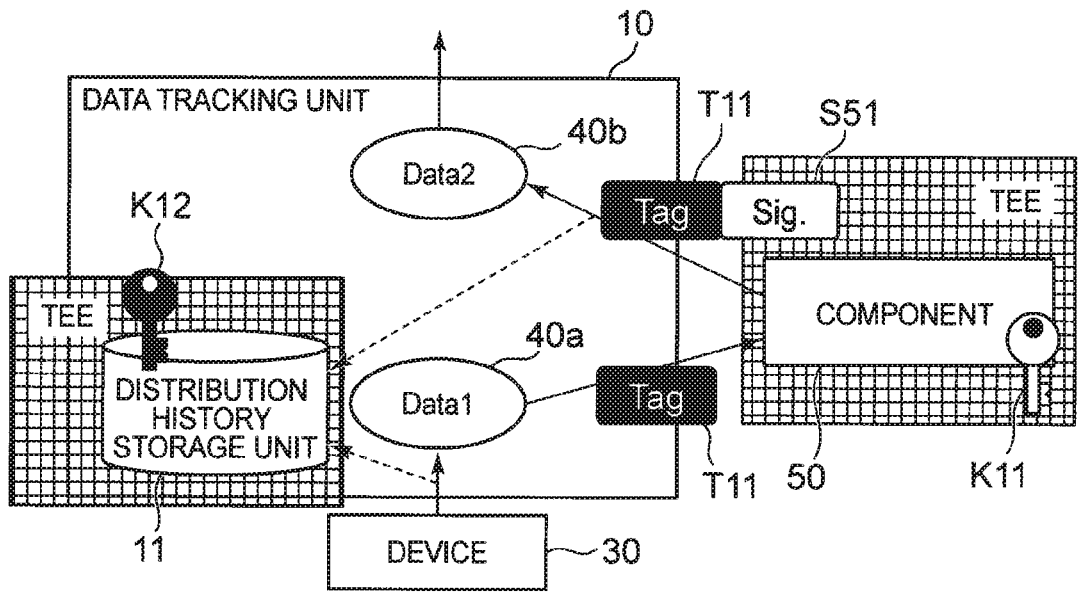
FIG. 16 It depicts an explanatory diagram illustrating another example of an operation for adding a signature by using a TEE.

Next, a second modification of the present exemplary embodiment will be described. FIG. 16 is an explanatory diagram illustrating another example of an operation for adding a signature by using the TEE. In the first modification, the case where the components are protected by the TEE has been described. In addition, as illustrated in FIG. 16, the distribution history storage unit 11 and the key K12 may be arranged in the TEE. In this configuration, when a message authentication code generated by the HMAC or CBC-MAC is used as a signature, the key for generating the message authentication code can be protected. More specifically, it is possible to avoid the risk that the key leaks from the distribution history storage unit 11 and a false component is generated using the key.

Furthermore, in a case where the component 50 is arranged inside the TEE, the data tracking unit 10 may detect tampering of the component 50 by using a remote attestation technology. The remote attestation is a technology in which hardware such as a CPU transmits a hash value or the like of software which is calculated by the hardware to a communication partner to confirm whether the communication partner has been tampered. The remote attestation is a known technique as described, for example, in the following reference, and the detailed description thereof will be omitted.

REFERENCE

Victor Costan, Srinivas Devadas, "Intel SGX Explained", January 2016. Intel Corporation, "Intel Software Guard Extensions", 332680-002, Rev. 1.1, June 2015.

Furthermore, as illustrated in FIG. 16, in a case where both of the distribution history storage unit 11 and the component 50 are arranged in the TEE, any one of the distribution history storage unit 11 and the component 50 may confirm that the other thereof has not been tampered, by using bidirectional remote attestation. Furthermore, transmission of information may be stopped, in a case where the remote attestation has found that any one of the distribution history storage unit 11 and the component 50, has been tampered.

Figure 17:
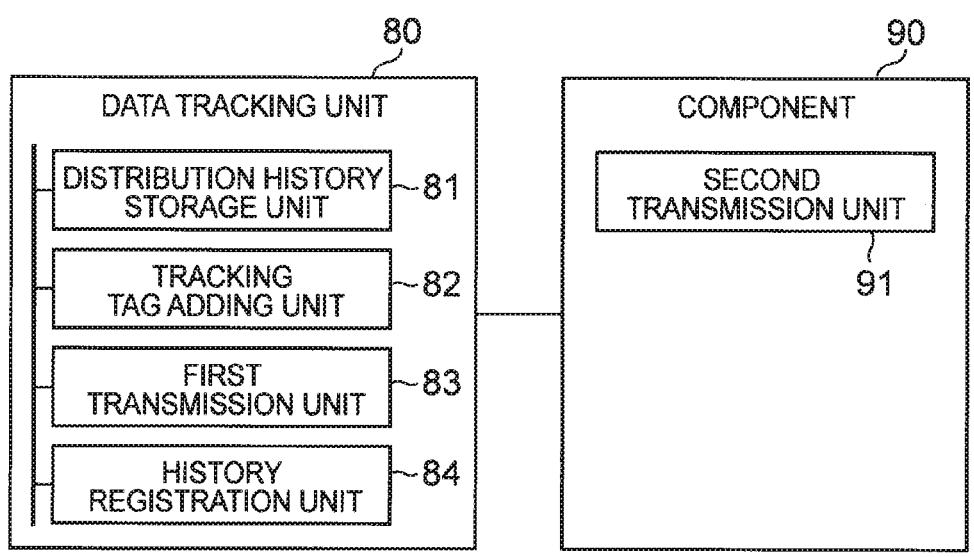
FIG. 17 It depicts a block diagram illustrating an outline of a distribution history management system according to the present invention.

Next, the outline of the present invention will be described. FIG. 17 is a block diagram illustrating an outline of a distribution history management system according to the present invention. The distribution history management system according to the present invention includes a data tracking unit 80 (e.g., the data tracking unit 10) that tracks data and at least one component 90 (e.g., the component 20) that processes data.

The data tracking unit 80 includes a distribution history storage unit 81 (e.g., the distribution history storage unit 11) that stores a distribution history of data, a tracking tag adding unit 82 (e.g., the tracking tag adding unit 12) that adds a tracking tag used to identify tracking data, a first transmission unit 83 (e.g., the first transmission unit 13) that transmits data to which the tracking tag is added to the component 90, and a distribution history registration unit 84 (e.g., the history registration unit 14) that registers a distribution history of the data to which the tracking tag is added, in the distribution history storage unit 81.

The component 90 includes a second transmission unit 91 (e.g., the second transmission unit 21) that transmits data to which the same tracking tag as a tracking tag added to the received data is added to another component 90 or the data tracking unit 80.

The history registration unit 84 registers a result of tracking of data associated with the same tracking tag, as a distribution history of the data, in the distribution history storage unit 81.

With such a configuration, the distribution history of data can be appropriately managed.

In addition, the component 90 may include a signature adding unit (e.g., the signature adding unit 23) that adds, to data, a signature indicating evidence of manipulation performed by the component 90 itself. Then, the second transmission unit 91 may transmit data to which the tracking tag and the signature are added, to another component 90 or the data tracking unit 80. Such a configuration can improve the reliability of data transmitted.

Specifically, the first transmission unit 83 of the data tracking unit 80 may transmit first data to which a tracking tag is added, to the component 90. At this time, the component 90 may include a first processing unit (e.g., the processing unit 22) that updates the first data received. Then, the second transmission unit 91 of the component 90 may add the tracking tag to the updated first data and transmit the data to the data tracking unit 80 so that the history registration unit 84 of the data tracking unit 80 generates a distribution history in which the first data transmitted from the first transmission unit 83 and the updated first data transmitted from the second transmission unit 91 are associated with the same added tracking tag. With such a configuration, it is possible to manage a distribution history of updating or the like of one block of data.

Furthermore, the first transmission unit 83 of the data tracking unit 80 may transmit a first data to which a tracking tag is added, to the component 90. At this time, the component 90 may include a second processing unit (e.g., the processing unit 22) that generates second data based on the first data received. Then, the second transmission unit 91 of the component 90 may add the tracking tag to the generated second data and transmit the data to the data tracking unit 80 so that the history registration unit 84 of the data tracking unit 80 generates a distribution history in which the first data transmitted from the first transmission unit 83 and the second data transmitted from the second transmission unit 91 are associated with the same added tracking tag. With such a configuration, it is possible to manage a distribution history in a case where different blocks of data is created from one block of data.

Furthermore, the first transmission unit 83 of the data tracking unit 80 may transmit, to the component, a third data to which a first tracking tag is added and a fourth data to which a second tracking tag is added. At this time, the component 90 may include a third processing unit (e.g., the processing unit 22) that generates a fifth data by combining the third data and fourth data received. In addition, the second transmission unit 91 of the component 90 may add both of the first tracking tag and second tracking tag to the fifth data as a result of the combination by the third processing unit and transmit the fifth data to the data tracking unit 80. Then, the history registration unit 84 of the data tracking unit 80 may generate a distribution history in which the third data and the fifth data are associated with the same tracking tag included in the tracking tags added to the fifth data and generate a distribution history in which the fourth data and the fifth data are associated with the same tracking tag included in the tracking tags added to the fifth data. With such a configuration, it is possible to manage a distribution history when data is created by merging a plurality of blocks of data.

In addition, the first transmission unit 83 of the data tracking unit 80 may transmit data to which the first tracking tag is added and data obtained by adding the second tracking tag to data having the same content as that of the data, to different components (specifically, a first component and a second component), respectively. At this time, a second transmission unit 91 of the first component 90 may transmit, to the data tracking unit 80, data to which the first tracking tag added to the data received is added, and a second transmission unit 91 of the second component 90 may transmit, to the data tracking unit 80, data to which the second tracking tag added to the data received is added. Then, the history registration unit 84 of the data tracking unit 80 may register a result of tracking of data associated with the first tracking tag, as a distribution history of the data, in the distribution history storage unit 81 and register a result of tracking of data associated with the second tracking tag, as a distribution history of the data, in the distribution history storage unit 81. With such a configuration, it is possible to manage a distribution history when manipulation is performed by transmitting the same data to a plurality of components.

Figure 18:
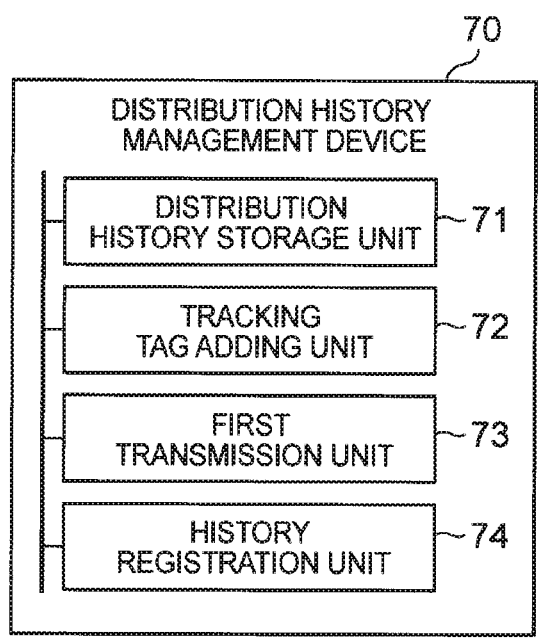
FIG. 18 It depicts a block diagram illustrating an outline of a distribution history management device according to the present invention.

FIG. 18 is a block diagram illustrating an outline of a distribution history management device according to the present invention. The distribution history management device 70 according to the present invention is a distribution history management device (e.g., the data tracking unit 10) that manages a distribution history of data and includes a distribution history storage unit 71 (e.g., the distribution history storage unit 11) that stores a distribution history of data, a tracking tag adding unit 72 (e.g., the tracking tag adding unit 12) that adds a tracking tag used to identify tracking data, a first transmission unit 73 (e.g., the first transmission unit 13) that transmits data to which a tracking tag is added, to a component (e.g., the component 20) that processes the data, and a history registration unit 74 (e.g., the history registration unit 14) that registers a distribution history of data to which the tracking tag is added, in the distribution history storage unit 61.

The history registration unit 74 receives data to which the same tracking tag as a tracking tag added to data received is added from a component that transmits the data to another component or the distribution history management device and registers a result of tracking of data associated with the same tracking tag, as a distribution history of the data, in the distribution history storage unit 71.

The distribution history of data can be appropriately managed with such a configuration, as well.

In addition, the history registration unit 74 may receive data from a component that transmits data after adding a signature indicating evidence of manipulation performed by the component itself to the data and register a distribution history of the data in the distribution history storage unit 71.

The part or whole of the exemplary embodiments disclosed above can be described as, but not limited to, the following supplementary notes.

(Supplementary Note 1)

A distribution history management system including a data tracking unit that tracks data and at least one component that processes data, in which the data tracking unit includes: a distribution history storage unit that stores a distribution history of the data; a tracking tag adding unit that adds a tracking tag used to identify tracking data; a first transmission unit that transmits data to which the tracking tag is added, to the component; and a history registration unit that registers, in the distribution history storage unit, a distribution history of the data to which the tracking tag is added, the component includes a second transmission unit that transmits data to which the same tracking tag as a tracking tag added to data received is added, to the data tracking unit or another component having the same structure as the at least one component, and the history registration unit registers a result of tracking of data associated with the same tracking tag, as the distribution history of the data, in the distribution history storage unit.

(Supplementary Note 2)

The distribution history management system according to supplementary note 1, in which the component includes a signature adding unit that adds to data a signature indicating evidence of manipulation performed by the component itself, and the second transmission unit transmits data to which a tracking tag and the signature are added to another component or the data tracking unit.

(Supplementary Note 3)

The distribution history management system according to supplementary note 1 or 2, in which the first transmission unit of the data tracking unit transmits first data to which a tracking tag is added, to a component, the component includes a first processing unit that updates the first data received, the second transmission unit of the component adds the tracking tag to the updated first data and transmits the data to the data tracking unit, and the history registration unit of the data tracking unit generates a distribution history in which the first data transmitted from the first transmission unit and the updated first data transmitted from the second transmission unit are associated with each other by the same added tracking tag.

(Supplementary Note 4)

The distribution history management system according to supplementary note 1 or 2, in which the first transmission unit of the data tracking unit transmits first data to which a tracking tag is added, to a component, the component includes a second processing unit that generates second data based on the first data received, the second transmission unit of the component adds the tracking tag to the generated second data and transmits the data to the data tracking unit, and the history registration unit of the data tracking unit generates a distribution history in which the first data transmitted from the first transmission unit and the second data transmitted from the second transmission unit are associated with each other by the same added tracking tag.

(Supplementary Note 5)

The distribution history management system according to claim 1 or 2, in which the first transmission unit of the data tracking unit transmits third data to which a first tracking tag is added and fourth data to which a second tracking tag is added to a component, the component includes a third processing unit that combines the third data and fourth data received to generate fifth data, the second transmission unit of the component adds both of the first tracking tag and the second tracking tag to the fifth data as a result of the combination by the third processing unit and transmits the data to the data tracking unit, and the history registration unit of the data tracking unit generates a distribution history in which the third data and the fifth data are associated with each other by the same tracking tag included in the tracking tags added to the fifth data and generates a distribution history in which the fourth data and the fifth data are associated with each other by the same tracking tag included in the tracking tags added to the fifth data.

(Supplementary Note 6)

The distribution history management system according to supplementary note 1 or 2, in which the first transmission unit of the data tracking unit transmits data to which a first tracking tag is added and data which has the same contents as the data and to which a second tracking tag is added, to different components, respectively, a second transmission unit of a first component transmits data to which the first tracking tag added to data received is added, to the data tracking unit, a second transmission unit of a second component transmits data to which the second tracking tag added to data received is added, to the data tracking unit, and the history registration unit of the data tracking unit registers a result of tracking of data associated with the first tracking tag, as a distribution history of the data, in the distribution history storage unit and registers a result of tracking of data associated with the second tracking tag, as the distribution history of the data, in the distribution history storage unit.

(Supplementary Note 7)

A distribution history management device managing a distribution history of data, the device including a distribution history storage unit that stores a distribution history of data; a tracking tag adding unit that adds a tracking tag used to identify tracking data; a first transmission unit that transmits data to which the tracking tag is added, to a component that processes the data; and a history registration unit that registers, in the distribution history storage unit, a distribution history of the data to which the tracking tag is added, in which the history registration unit receives data from the component that transmits the data to which the same tracking tag as a tracking tag added to data received is added, to the distribution history management device or another component having the same structure as the component and registers a result of tracking of data associated with the same tracking tag, as the distribution history of the data, in the distribution history storage unit.

(Supplementary Note 8)

The distribution history management device according to supplementary note 7, in which the history registration unit receives data from a component that transmits data after adding a signature indicating evidence of manipulation performed by the component itself to the data and registers a distribution history of the data in the distribution history storage unit.

(Supplementary Note 9)

A distribution history management method including: adding, by a data tracking unit that tracks data, a tracking tag used to identify tracking data; transmitting, by the data tracking unit, data to which the tracking tag is added to a component that processes data; transmitting, by the component, data to which the same tracking tag as a tracking tag added to the data received is added, to the data tracking unit or another component having the same structure as the component; registering, by the data tracking unit, a distribution history of the data to which the tracking tag is added, in a distribution history storage unit that stores a distribution history of the data; and upon registration of the distribution history of the data, registering, by the data tracking unit, a result of tracking of data associated with the same tracking tag, as the distribution history of the data, in the distribution history storage unit.

(Supplementary Note 10)

The distribution history management method according to supplementary note 9, further including: adding, by a component, a signature indicating evidence of manipulation performed by the component itself to data; and transmitting, by the component, the data to which a tracking tag and the signature are added to another component or the data tracking unit.

(Supplementary Note 11)

A distribution history management method including: adding a tracking tag used to identify tracking data; transmitting data to which the tracking tag is added to a component that processes the data; receiving from the component data to which a tracking tag the same as the tracking tag is added; registering a distribution history of the data to which the tracking tag is added, in a distribution history storage unit that stores a distribution history of data; and registering, upon registration of the distribution history of the data, a result of tracking of data associated with the same tracking tag, as the distribution history of the data, in the distribution history storage unit.

(Supplementary Note 12)

The distribution history management device according to supplementary note 11, which receives data from a component that transmits data after adding a signature indicating evidence of manipulation performed by the component itself to the data, and registers a distribution history of the received data in the distribution history storage unit.

(Supplementary Note 13)

A distribution history management program causing a computer to: perform a tracking tag adding process of adding a tracking tag used to identify tracking data, a first transmission process of transmitting data to which the tracking tag is added to a component that processes the data, and a history registration process of registering a distribution history of the data to which the tracking tag is added in a distribution history storage unit that stores a distribution history of data; and receive, in the history registration process, data to which the same tracking tag as a tracking tag added to data received is added from the component that transmits the data to the data tracking unit or another component having the same structure as the component, and register a result of tracking of data associated with the same tracking tag, as the distribution history of the data, in the distribution history storage unit.

(Supplementary Note 14)

The distribution history management program according to supplementary note 13, further causing a computer to, receive, in the history registration process, data from a component that transmits data after adding a signature indicating evidence of manipulation performed by the component itself to the data, and register a distribution history of the data in the distribution history storage unit.

REFERENCE SIGNS LIST

10 Data tracking unit
11 Distribution history storage unit
12 Tracking tag adding unit
13 First transmission unit
14 History registration unit 20, 20a, 20b, 50, 50a, 50b Component
21 Second transmission unit
22 Processing unit
23 Signature adding unit
30, 30a, 30b Device
40, 40a, 40b, 40c Memory
100 Distribution history management system
T11, T12 Tag
S51, S51a, S51b Signature
K11, K11a, K11b Secret key
K12, K12a, K12b Public key

The invention claimed is:

1. A distribution history management system comprising:
a data tracking unit; and
a component,
wherein the data tracking unit includes
a distribution history storage unit, and
a first hardware processor configured to execute a first software code to:
add, to tracked data, a tracking tag used to identify tracking data,
transmit the tracked data to which the tracking tag has been added, to the component, and
register, in the distribution history storage unit, a distribution history of the tracked data to which the tracking tag has been added,
the component includes
a second hardware processor configured to execute a second software code to:
generate new data based on the tracked data received from the data tracking unit;
add the tracking tag that has been added to the tracked data, to the new data; and
transmit the new data to the data tracking unit, and
the first hardware processor is configured to execute the first software code to further update registration of the distribution history of the tracked data in the distribution history storage unit with the new data received from the component, based on the tracked data and the new data both having had the tracking tag added thereto.

2. The distribution history management system according to claim 1, wherein
the second hardware processor is configured to execute the second software code to further add to the new data a signature indicating evidence of manipulation performed by the component itself, and
the data as transmitted to the data tracking unit includes the signature added thereto.

3. The distribution history management system according to claim 1, wherein the tracked data is first tracked data, the tracking tag is a first tracking tag,
the first hardware processor is configured to execute the first software code to:
add, to second tracked data, a second tracking tag,
transmit the second tracked data to which the second tracking tag has been added, to the component, and
register, in the distribution history storage unit, a distribution history of the second tracked data to which the second tracking data has been added,
the second hardware processor is configured to execute the second software code to further:
update the second tracked data received from the data tracking unit,
re-add the second tracking tag to the second tracked data that has been updated and transmit the second tracked data that has been updated and to which the different tracking tag has been re-added, to the data tracking unit, and
the first hardware processor is configured to execute the software code to further update registration of the distribution history of the second tracked data, in the distribution history storage unit, with the second tracked data as has been updated, based on the second tracked data prior to having been updated and after having been updated having had the second tracking tag added thereto.

4. The distribution history management system according to claim 1, wherein the tracked data is first tracked data, the tracking tag is a first tracking tag,
the first hardware processor configured to execute the first software code to:
add a second tracking tag to second tracked data and a third tracking data to third tracked data,
transmit the second tracked data to which the second tracking tag has been added and the third tracked data to which the third tracking tag has been added to the component, and
register, in the distribution history storage unit, a distribution history of the second tracked data to which the second tracking data has been added and a distribution history of the third tracked data to which the third tracking data has been added,
the second hardware processor is configured to execute the second software code to further:
combine the third tracked data and the fourth tracked data that have been received from the data tracking unit, to generate fourth racked data,
add both the second tracking tag and the third tracking tag to the fourth tracked data and transmit the fourth tracked data to which both the second tracking tag and the third tracking tag have been added, to the data tracking unit, and
the first hardware processor is configured to execute the first software code to further, in the distribution history storage unit, update registration of the distribution history of the second tracked data with the fourth tracked data received from the component based on the second tracked data and the fourth tracked data both having had the second tracking tag added thereto, and update registration of the distribution history of the third tracked data with the fourth tracked data received from the component based on the third tracked data and the fourth tracked data both having had the third tracking tag added thereto.

5. The distribution history management system according to claim 1, wherein the tracked data is first tracked data, the tracking tag is a first tracking tag, and the component is a first component,
the first hardware processor is configured to execute the first software code to transmit second tracked data to which a second tracking tag has been added and third tracked data having same contents as the second tracked data and to which a third tracking tag has been added, to first component and a second component, respectively,
the second hardware processor of the first component is configured to execute the second software code to add, to fourth tracked data, the second tracking tag that has been added to the second tracked data received from the data tracking unit, and to transmit the fourth tracked data to which the second tracking tag has been added to the data tracking unit, a third hardware processor of the second component configured to execute third software code to add, to fifth tracked data, the third tracking tag that has been added to the third tracked data received from the data tracking unit, and to transmit data the fifth tracked data to which the third tracking tag has been added to the data tracking unit, and the first hardware processor is configured to execute the first software code to further, in the distribution history storage unit, update registration of a distribution history of the second tracked data with the fourth tracked data based on the second tracked data and the fourth tracked data both having had the second tracking tag added thereto, and update registration of a distribution history of the third tracked data with the fifth tracked data based on the third tracked data and the fifth tracked data both having had the third tracking tag added thereto.

6. A distribution history management device managing a distribution history of data, the device comprising:
  a distribution history storage unit; and
  a hardware processor configured to execute software code to:
  add a tracking tag to tracked data;
  transmit the tracked data to which the tracking tag has been added, to a component that processes the tracked data and
  register, in the distribution history storage unit, a distribution history of the tracked data to which the tracking tag has been added;
  receive new data from the component that has been generated by the component based on the tracked data and to which the tracking tag has been added by the component; and
  update registration of the distribution history of the tracked data in the distribution history storage unit with the new data received from the component, based on the new data and the tracked data both having had the tracking tag added thereto.

7. The distribution history management device according to claim 6, wherein the new data received from the component also has had added thereto, by the component, a signature indicating evidence of manipulation performed by the component itself.

8. A distribution history management method comprising:
  adding, by a data tracking unit that tracks data, a tracking tag to tracked data;
  transmitting, by the data tracking unit, the tracked data to which the tracking tag has been added to a component that processes the tracked data;
  registering, by the data tracking unit, a distribution history of the tracked data to which the tracking tag has been added, in a distribution history storage unit;
  generating, by the component, new data based on the tracked data received from the data tracking unit;
  adding, by the component, the tracking tag that has been added to the tracked data, to the new data;
  transmitting, by the component, the new data to the data tracking unit; and
  updating, by the data tracking unit, the distribution history of the tracked data in the distribution history storage unit with the new data received from the component, based on the tracked data and the new data both having had the tracking tag added thereto.

9. The distribution history management method according to claim 8, further comprising:
  adding, by the component, a signature indicating evidence of manipulation performed by the component itself, to the new data, wherein; and
  the data as transmitted to the tracking unit includes the signature added thereto.

10. The distribution history management system according to claim 1, wherein
  the second hardware processor configured to execute the second software code to:
  generate new combined data from a plurality of different tracked data received from a plurality of different devices; and
  add different tracking tags respectively added to the plurality of different tracked data to the new combined data.

* * * * *